United States Patent
Im et al.

(10) Patent No.: US 11,821,128 B2
(45) Date of Patent: Nov. 21, 2023

(54) ARTIFICIAL INTELLIGENCE WASHING MACHINE AND CONTROLLING METHOD THEREFOR

(71) Applicant: LG Electronics Inc., Seoul (KR)

(72) Inventors: Myunghun Im, Seoul (KR); Hwanjin Jung, Seoul (KR); Seonhwa Yu, Seoul (KR); Sunggyun Kim, Seoul (KR); Kyungchul Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 21 days.

(21) Appl. No.: 16/557,411

(22) Filed: Aug. 30, 2019

(65) Prior Publication Data

US 2020/0109506 A1    Apr. 9, 2020

(30) Foreign Application Priority Data

Aug. 30, 2018   (KR) .................. 10-2018-0103081
Aug. 7, 2019    (KR) .................. 10-2019-0096301

(51) Int. Cl.
*G06N 3/08*    (2023.01)
*D06F 39/00*   (2020.01)
(Continued)

(52) U.S. Cl.
CPC ............ *D06F 34/18* (2020.02); *G06N 3/08* (2013.01); *D06F 2103/04* (2020.02); *D06F 2103/24* (2020.02); *D06F 2103/46* (2020.02)

(58) Field of Classification Search
CPC ............ D06F 34/18; D06F 2202/065; D06F 2202/10; D06F 2105/00; D06F 2103/04;
(Continued)

(56) References Cited

U.S. PATENT DOCUMENTS 5,241,845 A * 9/1993 Ishibashi ............. G05B 19/042
                                                    68/12.02
2003/0145633 A1* 8/2003 Merkle .................. D06F 39/02
                                                    68/17 R
(Continued)

FOREIGN PATENT DOCUMENTS

CN   103628275   3/2014
CN   107805914   3/2018
(Continued)

OTHER PUBLICATIONS

European Office Action in European Appln. No. 19 194 651.6, dated Nov. 23, 2020, 3 pages.
(Continued)

*Primary Examiner* — Michael E Barr
*Assistant Examiner* — Pallavi Chitta
(74) *Attorney, Agent, or Firm* — Fish & Richardson P.C.

(57) ABSTRACT

A control method of washing machine includes: a first detection step of acquiring amount of laundry accommodated in a washing tub; a first washing step of performing washing based on a first laundry amount, when the first laundry amount acquired in the first detection step is equal to or larger than a preset first threshold value; a second detection step of, acquiring the laundry amount accommodated in the washing tub by an output of an output layer of an artificial neural network while using a current value inputted to a motor for rotating and acceleration of the washing tub as an input data of an input layer of the artificial neural network previously learned by machine learning; and a second washing step of performing washing based on a second laundry amount, when the second laundry amount acquired in the second detection step is smaller than the first threshold value.

11 Claims, 14 Drawing Sheets

(51) Int. Cl.
*D06F 34/18* (2020.01)
*D06F 103/46* (2020.01)
*D06F 103/24* (2020.01)
*D06F 103/04* (2020.01)

(58) Field of Classification Search
CPC ........ G06N 3/08; G06N 3/084; G06N 3/0454;
G06N 3/0445; G06N 3/0472
See application file for complete search history.

(56) References Cited

U.S. PATENT DOCUMENTS

| | | | | |
|---|---|---|---|---|
| 2004/0200245 | A1* | 10/2004 | Cheo | D06F 39/02 68/17 R |
| 2011/0202303 | A1 | 8/2011 | Petronilho et al. | |
| 2017/0145621 | A1* | 5/2017 | Sumer | D06F 33/32 |

FOREIGN PATENT DOCUMENTS

| | | |
|---|---|---|
| CN | 107904860 | 4/2018 |
| EP | 2473661 | 7/2012 |
| EP | 2719812 | 4/2014 |
| EP | 3051016 | 8/2016 |
| JP | H02154793 | 6/1990 |
| JP | H02154793 A * | 6/1990 |
| JP | H04256790 | 9/1992 |
| JP | 2017029248 A * | 2/2017 |
| KR | 1020120110518 | 10/2012 |
| KR | 1020150019647 | 2/2015 |
| KR | 101841248 | 3/2018 |
| WO | WO2011025339 | 3/2011 |

OTHER PUBLICATIONS

Extended European Search Report in European Application No. 19194651.6, dated Nov. 8, 2019, 6 pages.
PCT International Search Report in International Application No. PCT/KR2019/011222, dated Feb. 7, 2020, 7 pages (with English translation).
Office Action in European Appln. No. 19194651.6, dated Sep. 15, 2021, 6 pages.
Office Action in Chinese Appln. No. 201910813870.3, dated Jun. 21, 2021, 14 pages (with English translation).

* cited by examiner

ARTIFICIAL INTELLIGENCE WASHING MACHINE AND CONTROLLING METHOD THEREFOR

CROSS REFERENCE TO RELATED APPLICATION

The present disclosure claims priority and the benefit of Korean Patent Application No. 10-2019-0096301, filed on Aug. 7, 2019 and Korean Patent Application No. 10-2018-0103081, filed on Aug. 30, 2018 in the Korean Intellectual Property, the disclosure of which is incorporated herein by reference in its entirety.

BACKGROUND

1. Technical Field

The present disclosure relates to a washing machine and a control method of washing machine, and more particularly, to a washing machine that performs laundry amount detection and laundry material detection based on machine learning, and a control method of washing machine.

2. Description of the Related Art

Generally, a washing machine is an apparatus for separating contaminants from clothes, bedding, etc. (hereinafter, referred to as "laundry") by using chemical decomposition of water and detergent, physical action such as friction between water and laundry, and the like.

Washing machines are classified into a stirrer-type washing machine, a vortex-type washing machine, and a drum-type washing machine. Among those washing machines, the drum-type washing machine is provided with a water storage tank for storing water, and a washing tub which is rotatably provided in the water storage tank and accommodates laundry. The washing tub is provided with a plurality of through holes through which water passes. The washing operation is generally divided into a washing process, a rinsing process, and a dewatering process. The progress of such a process can be checked through a display provided in a control panel.

The washing process removes contaminants from the laundry due to the friction of the water stored in the water storage tank and the laundry stored in the drum, and the chemical action of the detergent stored in the water.

The rinsing process is to rinse the laundry by supplying water in which the detergent is not contained into the water storage tank, and in particular, the detergent absorbed by the laundry during the washing process is removed. A fabric softener may be supplied together with water during the rinsing process.

The dewatering process is to rotate the washing tub at a high speed to dewater the laundry, after the rinsing process is completed. Normally, all the operations of the washing machine are completed by completing the dewatering process. However, in the case of a washer-dryer, a drying process may be further added after the dewatering process.

Normally, the washing operation is set according to the amount of the laundry (hereinafter, also referred to as "laundry amount") introduced into the washing tub. For example, the water level, the washing strength, the drainage time, and the dewatering time are set according to the laundry amount.

Therefore, there is a problem that sufficient washing performance can not be expected when the laundry amount is measured incorrectly.

In addition, the washing performance is affected not only by the amount of the laundry but also by the type of the laundry (hereinafter, also referred to as "laundry material"). When only the laundry amount is taken into consideration in setting the washing operation, sufficient washing performance can not be expected.

In addition, there is a problem that the degree of damage to laundry varies depending on the type of the laundry even in the case of the same washing operation, and the washing operation set only considering the laundry amount damages the laundry.

Meanwhile, recently, interest in machine learning such as artificial intelligence and deep learning has greatly increased.

Conventional machine learning is based on the statistical-based classification, regression, and cluster models. In particular, in the supervised learning of classification and regression models, the characteristics of learning data and a learning model that distinguishes new data based on such a characteristic is previously defined by a person. On the other hand, in deep learning, a computer searches and identifies characteristics by itself.

One of the factors that accelerated the development of deep learning is the deep-learning framework that is provided as open source. For example, the deep learning framework includes Theano of the University of Montreal, Canada, Torch of New York University, U.S.A. Caffe of the University of California at Berkeley, TensorFlow of Google, and the like.

With the release of deep learning frameworks, in addition to deep learning algorithm, the extraction and selection of data used in the learning process, the learning method, and the learning are becoming more important for effective learning and perception.

In addition, researches to utilize artificial intelligence and machine learning for various products and services are increasing.

Patent Registration 10-1841248 (hereinafter, also referred to as "prior art") discloses a control method of detecting the amount of laundry by using the speed of a motor as input data of an artificial neural network that has been learned through machine learning.

The prior art detects only the amount of laundry, and there is a problem of washing performance and laundry damage as described above.

SUMMARY

The present disclosure has been made in view of the above problems, and provides a washing machine for quickly and accurately detecting laundry amount and/or laundry material based on machine learning, and a control method thereof.

The present disclosure further provides a washing machine that can shorten the time required for the determination by efficiently processing data used for the determination of laundry amount/laundry material, and a control method thereof.

The present disclosure further provides a washing machine that can classify the laundry according to various criteria such as softness/stiffness of laundry, wetting rate, volume difference between wet laundry and dry laundry, and a control method thereof.

The present disclosure further provides a washing machine for setting a range for performing the laundry amount/laundry material detection based on machine learning, and a control method thereof.

The present disclosure further provides a washing machine that early determines quickly whether to perform the laundry amount/laundry material detection based on machine learning by a known laundry amount detection method, and can modify the washing course in consideration of the state of the laundry when the laundry amount determined by the known laundry amount detection method is inaccurate.

In accordance with an aspect of the present disclosure, a method of controlling a washing machine includes: a first detection step of acquiring amount of laundry accommodated in a washing tub; a first washing step of performing washing based on a first laundry amount, when the first laundry amount acquired in the first detection step is equal to or larger than a preset first threshold value; a second detection step of, after the first washing step, acquiring the laundry amount accommodated in the washing tub by an output of an output layer of an artificial neural network while using a current value applied to a motor for rotating the washing tub during an accelerated rotation of the washing tub as an input data of an input layer of the artificial neural network previously learned by machine learning; and a second washing step of performing washing based on a second laundry amount, when the second laundry amount acquired in the second detection step is smaller than the first threshold value.

The second detection step may include, after the first washing step, acquiring the laundry amount by the output of the output layer of the artificial neural network, while using a current value applied to a motor for rotating the washing tub during when the washing tub is accelerated and rotated as the input data of the input layer of the artificial neural network.

The second detection step may include accelerating and rotating the washing tub; acquiring a current value applied to the motor in a section in which the washing tub is accelerated and rotated; and acquiring the laundry amount by the output of the output layer of the artificial neural network, while using the current value as the input data of the input layer of the artificial neural network.

The accelerating and rotating the washing tub may include accelerating the washing tub from a first rotation speed up to a second rotation speed that is faster than the first rotation speed;

The second rotation speed may be a rotation speed at which the laundry is rotated integrally with the washing tub.

The second rotation speed may be a rotation speed at which the laundry in the washing tub rotates while being attached to the washing tub without falling even from the highest point of the washing tub. The second rotational speed may be a rotation speed at which the centrifugal force acting on the laundry by the rotation of the washing tub is greater than the gravity acting on the laundry.

The second rotation speed may be 60 rpm to 80 rpm.

The first rotation speed may be 10 rpm to 20 rpm.

The accelerating and rotating the washing tub may include accelerating a rotation speed of the washing tub at a constant acceleration from the first rotation speed up to the second rotation speed.

The acquiring the laundry amount may include using the current value applied to the motor as the input data in a section in which the rotation speed of the washing tub is accelerated from the first rotation speed up to the second rotation speed.

The second detection step may include detecting a rotation speed of the washing tub.

The acquiring the laundry amount may include selecting a current value corresponding to a section in which the rotation speed of the washing tub is accelerated from the first rotation speed up to the second rotation speed among current values acquired in acquiring a current value, based on the detected speed value; and using the selected current value as the input data.

The second detection step may include acquiring a state of the laundry accommodated in the washing tub by the output of the output layer of the artificial neural network while using the current value as the input data of the input layer of the artificial neural network.

The second washing step may include performing washing based on the second laundry amount and the laundry state.

The state of the laundry may be classified in consideration of a risk of wear of the laundry and a washing intensity.

The second washing step may include selecting one of a plurality of washing modes classified in consideration of a risk of wear of the laundry and the washing intensity, based on the second laundry amount and the laundry state; and performing washing according to the selected washing mode. The plurality of washing modes may be classified in consideration of wear of the laundry and washing strength.

A washing machine according to another aspect of the present disclosure may perform the above mentioned control method.

In accordance with another aspect of the present disclosure, a washing machine includes: a washing tub which accommodates laundry and is rotatably provided, a motor for rotating the washing tub, a controller for controlling the motor to rotate the washing tub, and a current detection unit for detecting a current of the motor.

The controller may acquire the laundry amount and the laundry state in an output layer of an artificial neural network while using a current value detected by the current detection unit during an accelerated rotation of the washing tub as an input data of an input layer of the artificial neural network. The artificial neural network may be previously learned by machine learning The controller may perform a washing processes based on the laundry amount and the laundry state acquired by the output of the artificial neural network.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTIONS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure. Reference will now be made in detail to the preferred embodiments of the present disclosure, examples of which are illustrated in the accompanying drawings. The suffixes "module" and "unit" in elements used in description below are given only in consideration of ease in preparation of the specification and do not have specific meanings or functions. Therefore, the suffixes "module" and "unit" may be used interchangeably.

Figure 1:
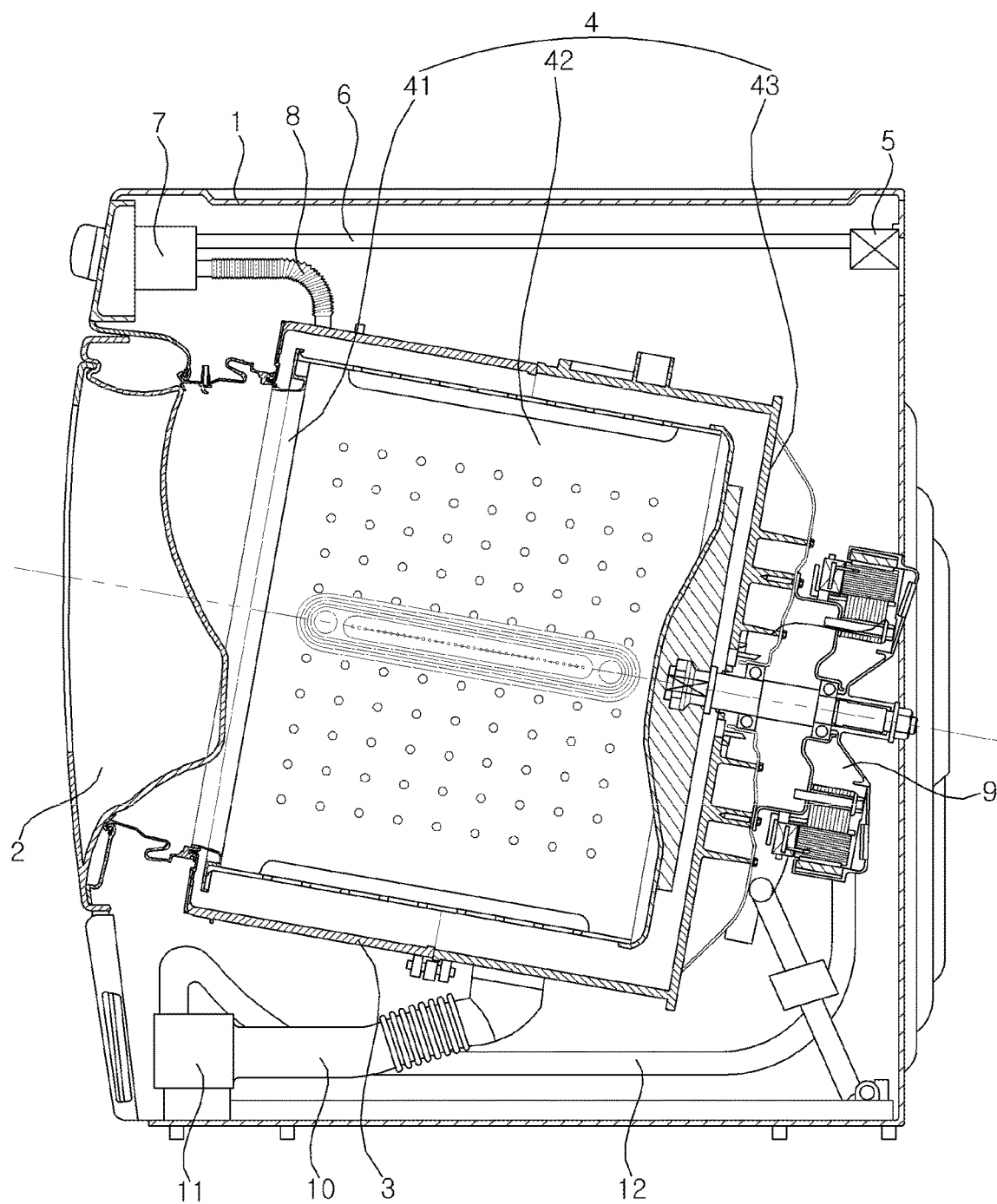
FIG. 1 is a sectional view of an example washing machine.
Figure 2:
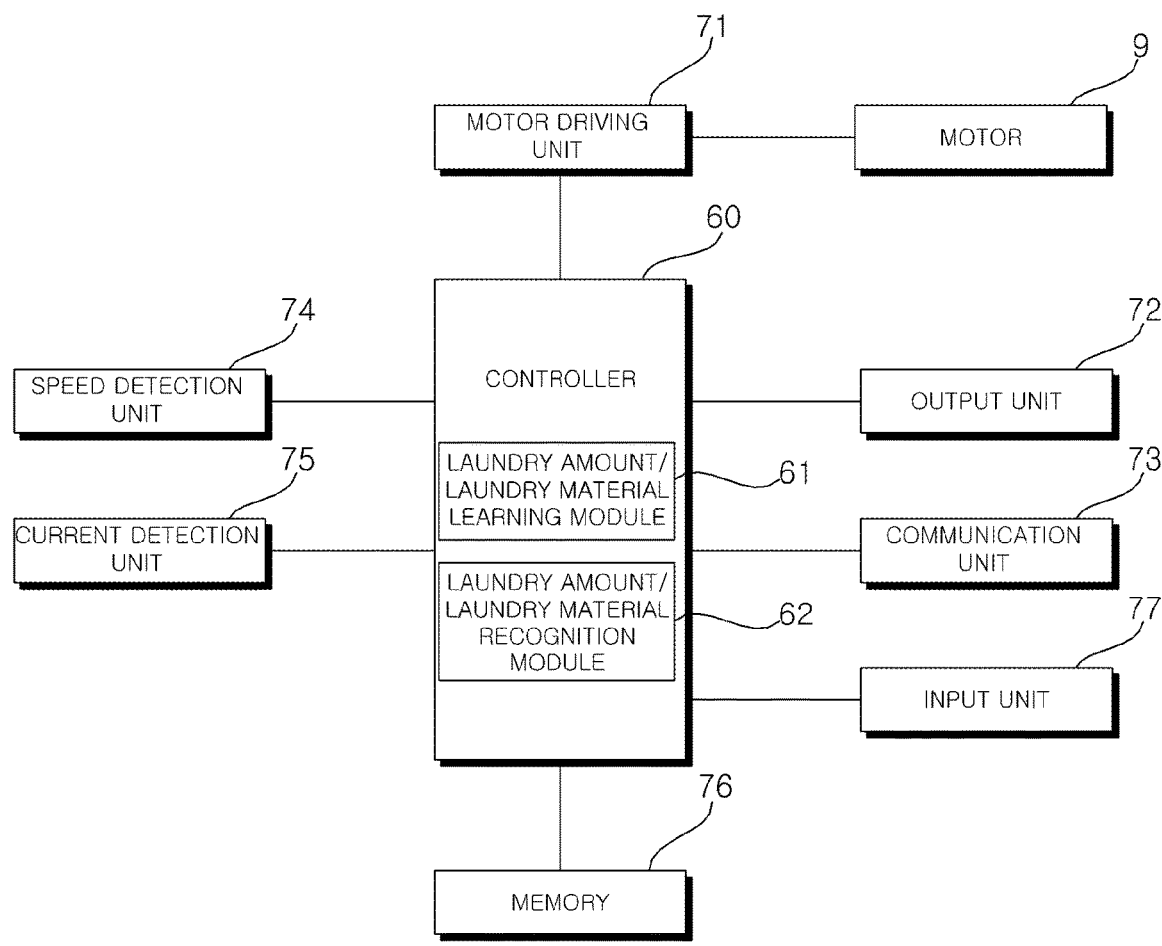
FIG. 2 is a block diagram showing an example control relationship between the main components of the washing machine of FIG. 1.

FIG. 1 is a sectional view of an example washing machine. FIG. 2 is a block diagram showing an example control relationship between the main components of the washing machine of FIG. 1.

Referring to FIG. 1, the washing machine according to an embodiment of the present disclosure includes a casing 1 forming an outer shape, a water storage tank 3 which is disposed in the casing 1 and stores washing water, a washing tub 4 which is rotatably installed in the water storage tank and into which laundry is loaded, and a motor 9 for rotating the washing tub 4.

The washing tub 4 includes a front cover 41 having an opening for loading and unloading the laundry, a cylindrical drum 42 which is substantially horizontally disposed and whose front end is coupled with the front cover 41, and a rear cover 43 coupled to a rear end of the drum 42. The rotation shaft of the motor 9 may pass through the rear wall of the water storage tank 3 and be connected to the rear cover 43. A plurality of through holes may be formed in the drum 42 so that water can be exchanged between the washing tub 4 and the water storage tank 3.

The washing tub 4 is rotated around a horizontal shaft. Here, the term "horizontal" does not mean geometric horizontal in the strict sense. That is, since it is closer to horizontal than vertical even when it is inclined at a certain angle with respect to the horizontal as shown in FIG. 1, it can be said that the washing tub 4 is rotated around a horizontal shaft.

A laundry loading port is formed in the front surface of the casing 1, and a door 2 for opening and closing the laundry loading port is rotatably provided in the casing 1. A water supply valve 5, a water supply pipe 6, and a water supply hose 8 may be installed in the casing 1. When the water supply valve 5 is opened to perform water supply, the washing water passed through the water supply pipe 6 may be mixed with the detergent in a dispenser 7 and then supplied to the water storage tank 3 through the water supply hose 8.

The input port of the pump 11 is connected to the water storage tank 3 by a discharge hose 10 and the discharge port of the pump 11 is connected to a drain pipe 12. The water discharged from the water storage tank 3 through the discharge hose 10 is pumped by the pump 11 to flow along the drain pipe 12 and then discharged to the outside of the washing machine.

Referring to FIG. 2, the washing machine according to the embodiment of the present disclosure includes a controller 60 for controlling the overall operation of the washing machine, a motor driving unit 71 controlled by the controller 60, an output unit 72, a communication unit 73, a speed detection unit 74, a current detection unit 75, and a memory 76.

The controller 60 may control a series of washing processes of washing, rinsing, dewatering, and drying. The controller 60 may perform washing and rinsing processes according to a preset algorithm, and the controller 60 may also control the motor driving unit 71 according to the algorithm.

The motor driving unit 71 may control the driving of the motor 9 in response to a control signal applied from the controller 60. The control signal may be a signal for controlling the target speed of the motor 9, the acceleration slope (or acceleration), the driving time, and the like.

The motor driving unit 71 is implemented to drive the motor 9 and may include an inverter (not shown) and an inverter controller (not shown). Further, the motor driving unit 71 may further include a converter or the like that supplies DC power inputted to the inverter.

For example, when the inverter controller (not shown) outputs a switching control signal of pulse width modulation (PWM) scheme to the inverter (not shown), the inverter (not shown) performs a high-speed switching operation, and may supply AC power of a certain frequency to the motor 9.

The speed detection unit 74 detects the rotation speed of the washing tub 4. The speed detection unit 74 may detect the rotation speed of the rotor of the motor 9. When a planetary gear train for rotating the washing tub 4 is provided by changing the rotation ratio of the motor 9, the rotation speed of the washing tub 4 may be a value acquired by converting the rotation speed of the rotor detected by the speed detection unit 74 in consideration of the deceleration or speed increasing ratio of the planetary gear train.

The controller 60 may control the motor driving unit 71 so that the motor 9 follows a preset target speed by feeding back the current speed transmitted from the speed detection unit 74.

The current detection unit 75 detects a current (hereinafter, referred to as 'current') applied to the motor 9 and transmits the detected current to the controller 60. The controller 60 may detect the laundry amount and the laundry material by using the received current data as input data. At this time, the current values as the input data include the values acquired during the process where the motor 9 is accelerated toward a preset target speed.

When the rotation of the motor 9 is controlled by the vector control based on the torque current and the magnetic flux current, the present current may be a torque axis (q-axis) component of the current flowing in a motor circuit, i.e., a torque current Iq.

The output unit 72 outputs the operating state of the washing machine. The output unit 72 may be an image output device such as an LCD or LED for outputting a visual display, or a sound output device such as a buzzer for outputting sound. The controller 60 may control the output unit 72 to output information on the laundry amount or the laundry material.

The memory may store a programmed artificial neural network, current patterns for each laundry amount and/or laundry material, a database (DB) constructed through a machine learning based on the current pattern, machine learning algorithm, a present current value detected by the current detection unit 75, a value acquired by averaging the present current values, a value acquired by processing the average values according to a parsing rule, data transmitted and received through the communication unit 73, and the like In addition, the memory 76 may store various control data for controlling the overall operation of the washing machine, washing setting data inputted by a user, washing time calculated according to the washing setting, data on the washing course or the like, data for determining occurrence of error of the washing machine, and the like.

The communication unit 73 may communicate with a server connected to a network. The communication unit 73 may include one or more communication modules such as an Internet module and a mobile communication module. The communication unit 73 may receive learning data and various data such as algorithm update from the server.

The controller 60 may process various data received through the communication unit 73 and update the memory 76. For example, if the data inputted through the communication unit 73 is update data for an operation program previously stored in the memory 76, it is used to update the memory 76, and if the inputted data is a new operation program, it can be additionally stored in the memory 76.

Deep Learning is a scheme of teaching computers people's minds based on Artificial Neural Network (ANN) for constructing artificial intelligence, and is an artificial intelligence technology that allows a computer to learn by itself like a person without being taught by a person. The Artificial Neural Network (ANN) may be implemented in software form, or in hardware form such as a chip.

The washing machine may process the current values detected by the current detection unit 75 based on machine learning and determine the characteristics (hereinafter, referred to as laundry characteristics) of laundry loaded into the washing tub 4. Such a laundry characteristic may be exemplified by the laundry amount and the state of laundry (hereinafter, also referred to as 'laundry material'), and the controller 60 may determine the laundry material for each laundry amount based on machine learning. For example, the controller 60 may acquire the laundry amount, and may determine the belonged category among categories that are pre-classified according to the laundry material. The state of the laundry may be defined based on various factors such as the material of the laundry, the degree of softness (e.g., soft laundry/hard laundry), the ability of the laundry to hold water (i.e., wetting rate), a volume difference between wet laundry and dry laundry, the composition of the laundry (i.e., the mixing ratio of the soft laundry and the hard laundry).

The controller 60 may detect the laundry volume, by using the present current value detected by the current detection unit 75 up to the time point of reaching the target speed, as the input data of the artificial neural network previously learned by machine learning.

Figure 3:
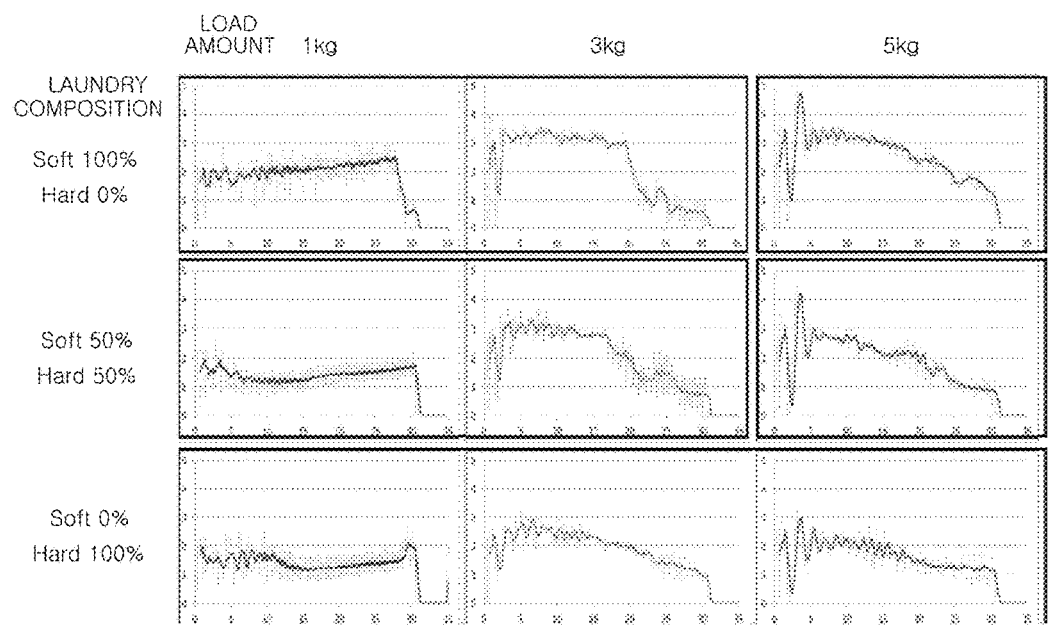
FIG. 3 shows an example current pattern applied to a motor according to the state of laundry and a load amount (laundry amount)
Figure 4:
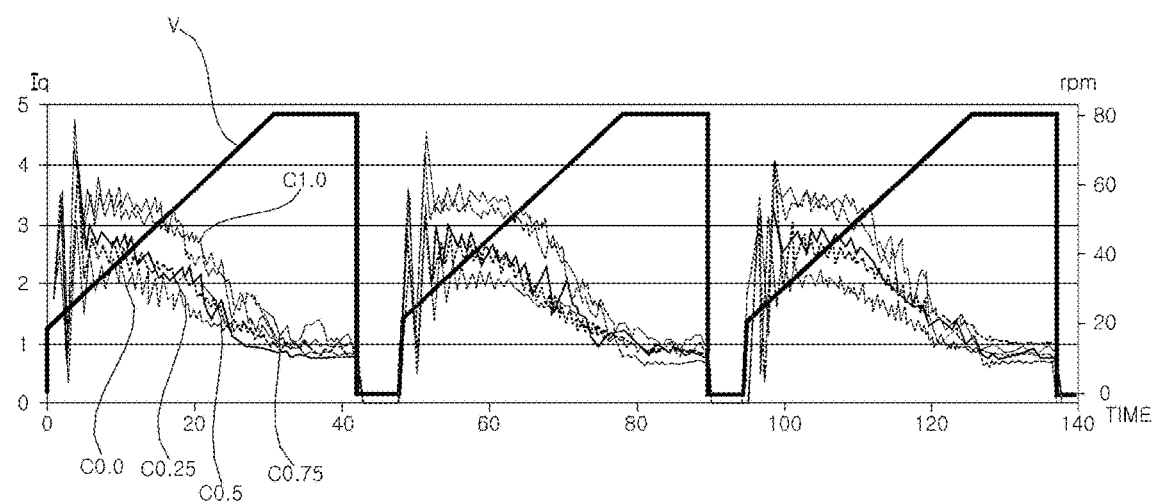
FIG. 4 shows an example current pattern for each laundry material.
Figure 5:
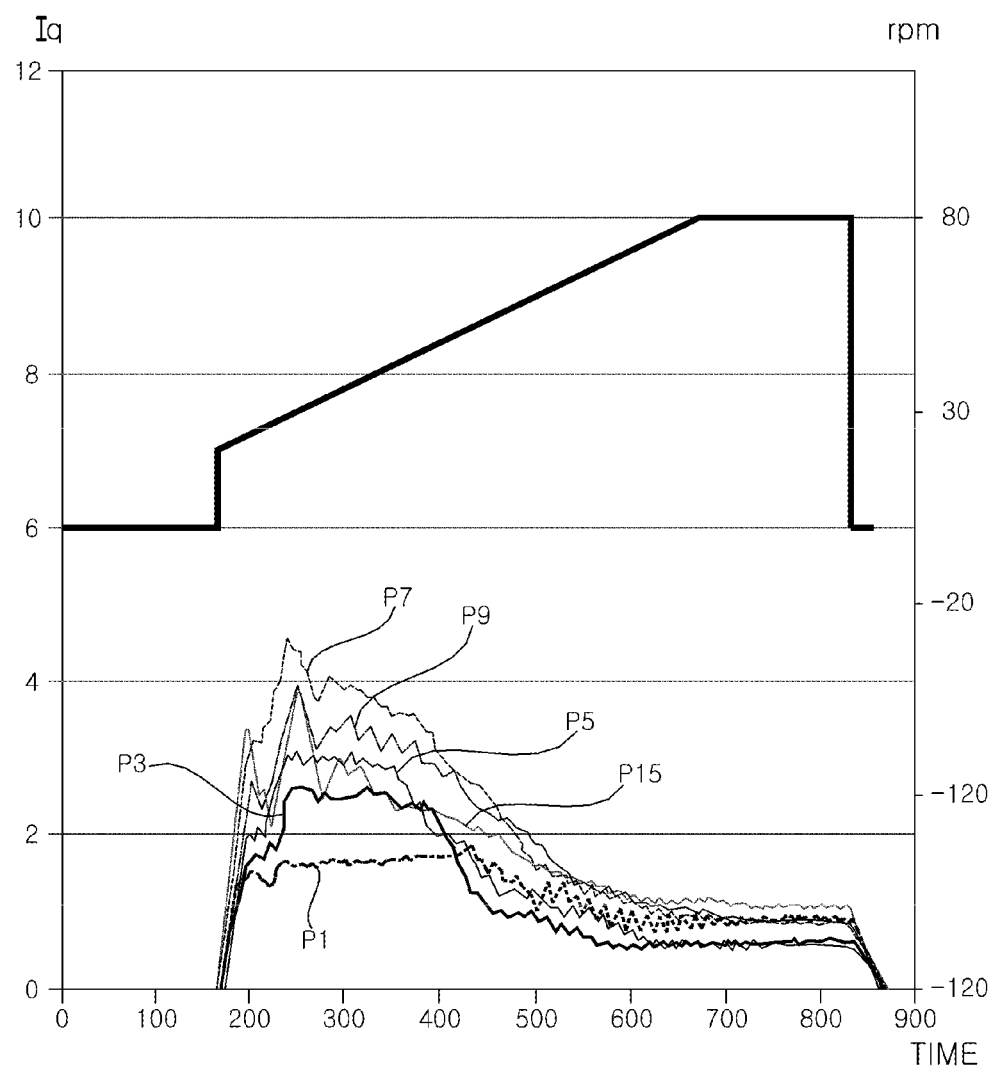
FIG. 5 shows an example current pattern for each load while controlling the speed of a motor by a preset method.

FIG. 3 shows an example current pattern applied to a motor according to the state of laundry and a load amount (laundry amount). FIG. 4 shows an example current pattern for each laundry material. FIG. 5 shows an example current pattern for each load while controlling the speed of a motor by a preset method.

Each graph shown in FIG. 3 shows the present current measured while accelerating the washing tub 4 up to a preset target rotation speed (e.g., 80 rpm), and these graphs show the current measured while varying the composition of the laundry (i.e., the mixing ratio of the soft laundry and the hard laundry). That is, the trend of the pattern change according to the load amount can be determined through the horizontally arranged graphs. For example, in the case of the same laundry composition, it can be seen that the maximum value of the present current becomes larger at the beginning of the acceleration of the washing tub 4, as the load becomes larger. Therefore, it can be said that the early data is appropriate to be used to determine the load amount (laundry amount).

Through the vertically arranged graphs, the change in the shape of the pattern according to the laundry composition can be determined. For example, in the case of the same load amount, it can be seen that the current value is shifted downward as the ratio of coarse laundry becomes larger, particularly, in the mid and latter half of acceleration of the washing tub 4 or in a target rotation speed maintenance section. Therefore, it can be said that it is appropriate to take data necessary to acquire the laundry material after a section in which data to be used for determining the laundry amount is acquired.

FIG. 4 shows an example current pattern for each composition of laundry (each laundry material). In FIG. 4, C0.0 shows soft laundry 100%, C0.25, C0.5, and C0.75 show soft laundry 100% sequentially, the ratio of soft laundry: hard laundry is 1:3, 1:1, 3:1, and C1.0 shows the case of hard laundry 100%. In each case, the total laundry amount (load amount) acquired by adding the soft laundry to the hard laundry is constant.

The graphs show that the current pattern is varied when the composition of laundry is varied, even if the load amount is the same. Therefore, classification according to the composition of laundry (or laundry material) may be achieved based on the machine learning of the current pattern.

Such laundry amount/laundry material detection can be repeated a plurality of times, and in the embodiment, it is repeated three times, but the number of times is not limited thereto. The laundry amount/laundry material detection may be repeated a plurality of times in the same step, or may be repeated a plurality of times in different steps.

The controller 60 may set washing algorithm or change the setting of washing algorithm according to the result of each laundry amount/laundry material detection, and may control the operation of the washing machine according to the setting.

The graphs P1, P3, P5, P7, P9, and P15 shown in FIG. 5 show the cases where the laundry amounts are 1, 3, 5, 7, 9, and 15 kg, respectively. As a whole, the graphs show that in the early stage of the acceleration of the washing tub 4, the present current value rapidly rises up to a certain level and converges to a constant value as it goes to the latter half. In particular, it can be seen that the deviation of the present current value due to the laundry amount is noticeable in the early stage of acceleration of the washing tub 4.

The controller 60 may include a laundry amount/laundry material learning module 61 and a laundry amount/laundry material recognition module 62. The laundry amount/laundry material learning module 61 may perform the machine learning by using the present current value detected by the current detection unit 75 or a value acquired by processing the present current value. Through such machine learning, the laundry amount/laundry material learning module 61 may update the database stored in the memory 76.

Any of the unsupervised learning and the supervised learning may be used as the learning method of the laundry amount/laundry material learning module 61.

The laundry amount/laundry material recognition module 62 may determine the level according to the laundry amount based on the data learned by the laundry amount/laundry material learning module 61. The determination of the laundry amount may be a task of classifying the laundry put into the washing tub 4 into a plurality of pre-set laundry amount level according to the weight (load).

In the embodiment, the laundry amount is classified into five steps (levels), and the load amount (kg) corresponding to each step is shown in Table 1 below. In addition, Table 1 statistically shows the number of household members constituting the household when a corresponding laundry amount is loaded to the washing machine in a single household.

TABLE 1

| Laundry amount (five steps) | Load amount | Number of household members |
| --- | --- | --- |
| Level 1 | 0~1 kg | 1 person |
| Level 2 | 1~3 kg | 1~2 people |
| Level 3 | 3~5 kg | 2 people |
| Level 4 | 5~6 kg | 3 people or more |
| Level 5 | 6 kg or more | more |

The determination of the laundry material may be achieved by classifying the laundry loaded into the washing tub 4 according to preset criteria. The criteria may be the material of the laundry, the degree of softness or stiffness, the wetting rate, a volume difference between wet laundry and dry laundry.

Based on the present current value acquired from the current detection unit 75, the laundry amount/laundry material recognition module 62 determines which step of a plurality of laundry amount steps corresponds to the laundry loaded to the washing tub 4 and, at this time, which classification corresponds to the laundry material (i.e., the laundry material for each laundry amount).

In the embodiment, the laundry material is classified into five steps (levels), and the types corresponding to each step are shown in Table 2 below. Referring to Table 2 below, the soft and weakly durable clothes series may be classified into level 1, the clothes series having a stronger durability than level 1 may be classified into level 3, the stiff clothes series having a stronger durability than level 3 may be classified into level 5, the mixed clothes series of level 1 and level 3 may be classified into level 2, and the mixed clothes series of level 3 and level 5 may be classified into level 4.

TABLE 2

| Laundry material (five steps) | Abrasion/Washing strength | Type |
| --- | --- | --- |
| Level 1 | Abrasion: high Washing strength: low | Light and soft fabric, delicate material (e.g. silk) underwear |
| Level 2 | Level 1, level 3 clothing mix | |
| Level 3 | Abrasion: mid Washing strength: mid | Cotton outerwear, cotton/blend underwear |
| Level 4 | Level 3, level 5 clothing mix | Thick material, tough material, stiff |
| Level 5 | Abrasion: low Washing strength: high | clothing (autumn jumper, winter jumper, work clothes, etc.) |

The laundry amount/laundry material recognition module 62 may be equipped with artificial neural networks (ANN) previously learned by machine learning. Such artificial neural network may be updated by the laundry amount/laundry material learning module 61.

The laundry amount/laundry material recognition module 62 may determine the laundry amount and the laundry material based on the artificial neural network. If the laundry amount is classified into five levels as in the embodiment, the laundry amount/laundry material recognition module 62 may determine the step to which the laundry amount belongs, and further determine the step to which the laundry material belongs by using the present current value detected by the current detection unit 75 as the input data of the artificial neural network (ANN).

The laundry amount/laundry material recognition module 62 may include an artificial neural network (ANN) that is learned to classify the laundry amount and the laundry material into steps according to a certain criteria. For example, the laundry amount recognition module 62 may include a Deep Neural Network (DNN), such as a Convolutional Neural Network (CNN), a Recurrent Neural Network (RNN), and a Deep Belief Network (DBN), learned by Deep Learning.

The Recurrent Neural Network (RNN) is widely used in natural language processing, and an artificial neural network structure can be constituted by stacking layers at each moment with an effective structure for time-series data processing that varies over time.

The Deep Belief Network (DBN) is a deep learning structure configured by stacking multiple layers of Restricted Boltzman Machine (RBM) which is a deep learning scheme. The Restricted Boltzman Machine (RBM) learning may be repeated, and a Deep Belief Network (DBN) having a corresponding number of layers can be constituted when a certain number of layers are achieved.

The Convolutional Neural Network (CNN) is a model that simulates a human brain function based on the assumption that when a person recognizes an object, it extracts the basic features of the object, then undergoes complicated calculations in the brain, and recognizes the object based on the calculation result.

Meanwhile, the learning of artificial neural network may be achieved by adjusting the weight of the inter-node connection (if necessary, adjusting the bias value) so that a desired output is acquired for a given input. The artificial neural network may continuously update the weight value by learning. A scheme such as Back Propagation may be used for learning of artificial neural networks.

The laundry amount/laundry material recognition module 62 may use the present current value as input data, and determine at least one of the laundry amount and the laundry material loaded to the washing tub 4 by using the output of an output layer, based on the weight between the nodes included in the DNN.

Figure 7:
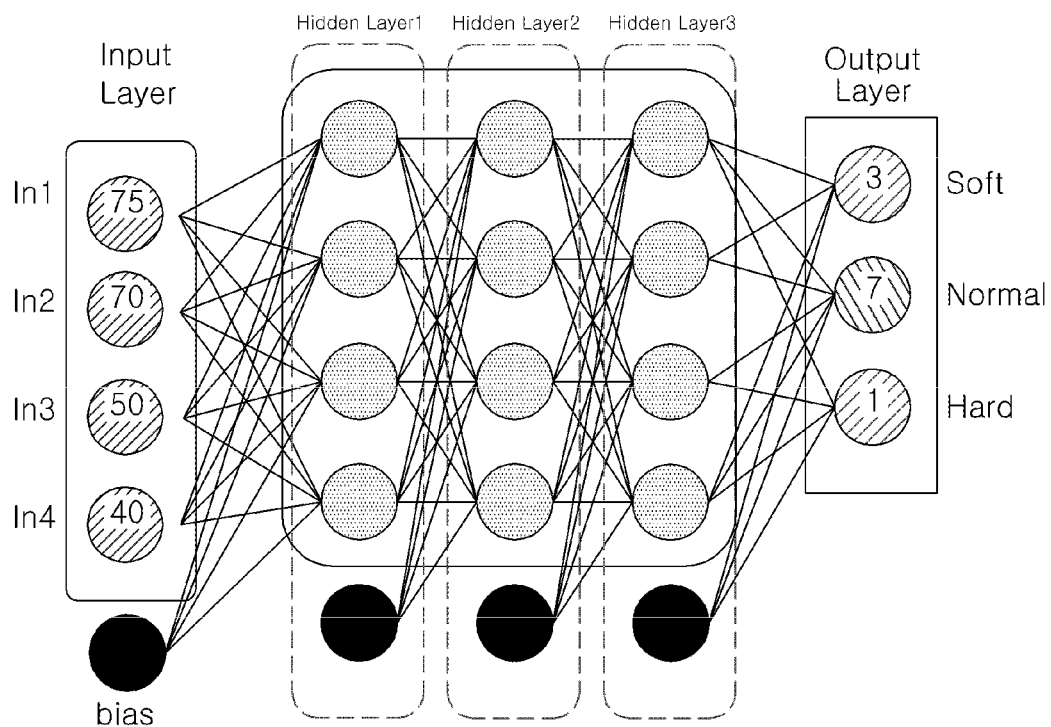
FIG. 7 is a schematic diagram showing an example of an artificial neural network.
Figure 8:
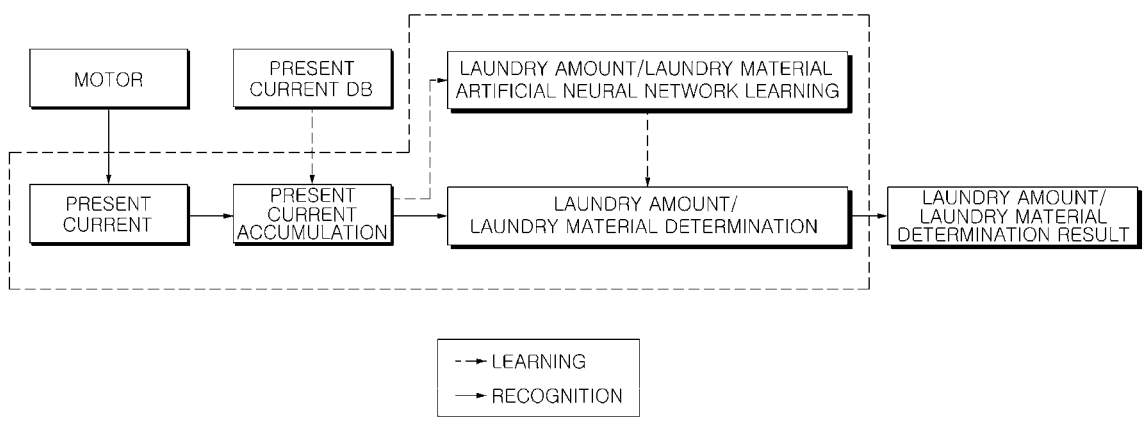
FIG. 8 is a schematic diagram dividing an example process of determining a laundry amount and a laundry material by using a current value of a motor into a learning process and a recognition process.

FIG. 7 is a schematic diagram showing an example of an artificial neural network. FIG. 8 is a schematic diagram dividing an example process of determining a laundry amount and a laundry material by using a current value of a motor into a learning process and a recognition process.

Referring to FIGS. 7 to 8, a deep learning technology, which is a type of machine learning, is a scheme of performing learning while progressing up to a deep level with multi step based on data.

The deep learning may represent a set of machine learning algorithms that extract key data from multiple data while going through hidden layers in turn.

The deep learning structure may include an artificial neural network (ANN). For example, the deep learning structure may be constituted by a deep neural network (DNN) such as a Convolutional Neural Network (CNN), Recurrent Neural Network (RNN), Deep Belief Network (DBN).

Referring to FIG. 7, the artificial neural network (ANN) may include an input layer, a hidden layer, and an output layer. When multiple hidden layers are provided, it is called Deep Neural Network (DNN). Each layer contains a plurality of nodes, and each layer is associated with the next layer. Nodes can be connected to each other while having weights.

The output of any node belonging to a first hidden layer (Hidden Layer 1) becomes the input of at least one node belonging to a second hidden layer (Hidden Layer 2). At this time, the input of each node may be a value to which a weight is applied to the output of the node of the previous layer. The weight may mean link strength between nodes. The deep learning process may be considered as a process of finding a proper weight.

Here, the well-known face recognition process is reviewed so as to better understand deep learning. The computer may distinguish bright pixel and dark pixel from the input image according to the brightness of the pixel, distinguish simple form such as border and edge, and then distinguish a little bit more complicated shape and object. Finally, the computer may determine the form that defines a human face. Thus, the specification of the feature (defining the human face form) is finally acquired from the output layer after passing through the hidden layers of the middle layer.

The memory 76 may store input data for detecting the laundry amount, and data for learning the deep neural network (DNN). The memory 76 may store motor speed data acquired by the speed detection unit 74 and/or data acquired by summing or calculating speed data by certain intervals. In addition, the memory 76 may store weights and biases constituting a deep neural network (DNN) structure.

Alternatively, in some embodiments, the weights and biases constituting a deep neural network (DNN) structure may be stored in an embedded memory of the laundry amount/laundry material recognition module 62.

Meanwhile, the laundry amount/laundry material learning module 61 may perform learning by using the present current value detected through the current detection unit 75 as training data. That is, the laundry amount/laundry material learning module 61 may update a structure of the deep neural network (DNN) such as weight or bias by adding a determination result to a database whenever recognizing or determining the laundry amount and/or laundry material, or may update a DNN structure such as a weight by performing a learning process by using training data secured after a certain number of training data is secured.

The washing machine according to the embodiment of the present disclosure may transmit the present current data acquired by the current detection unit 75 through the communication unit 73 to a server (not shown) connected to a communication network, and may receive data related to machine learning from the server. In this case, the washing machine may update the artificial neural network based on data related to the machine learning received from the server.

Figure 9A:
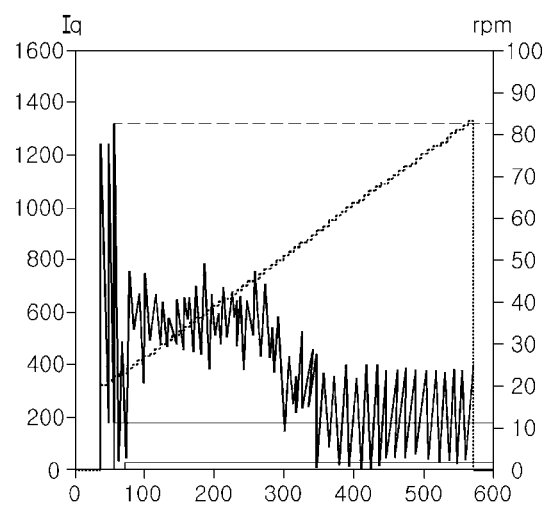
FIG. 9A is an example graph showing current value detected by a current detection unit.
Figure 9B:
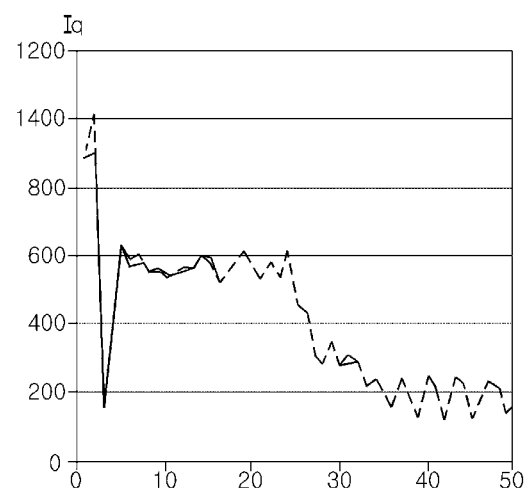
FIG. 9B is a graph showing average values acquired by processing a moving average filter.
Figure 10:
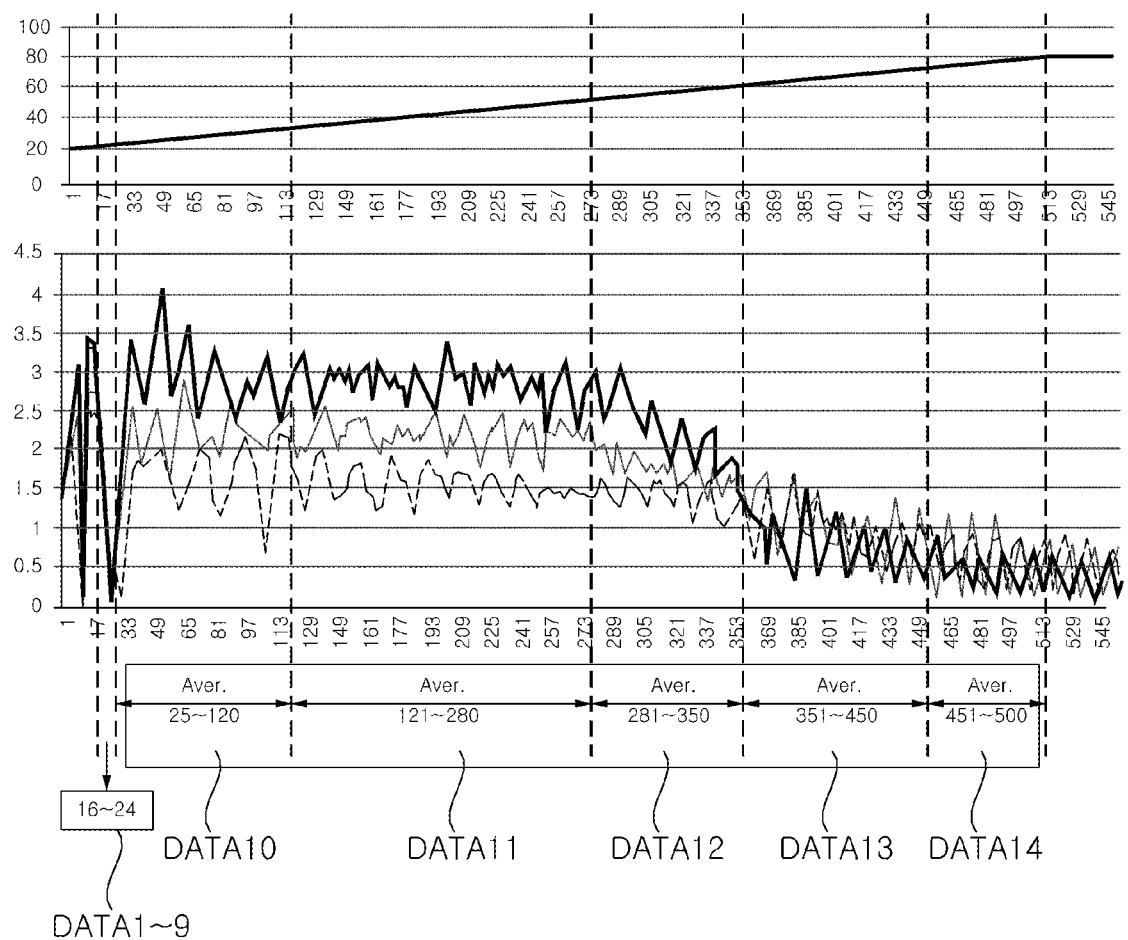
FIG. 10 is an example graph showing current values detected by a current detection unit.
Figure 11:
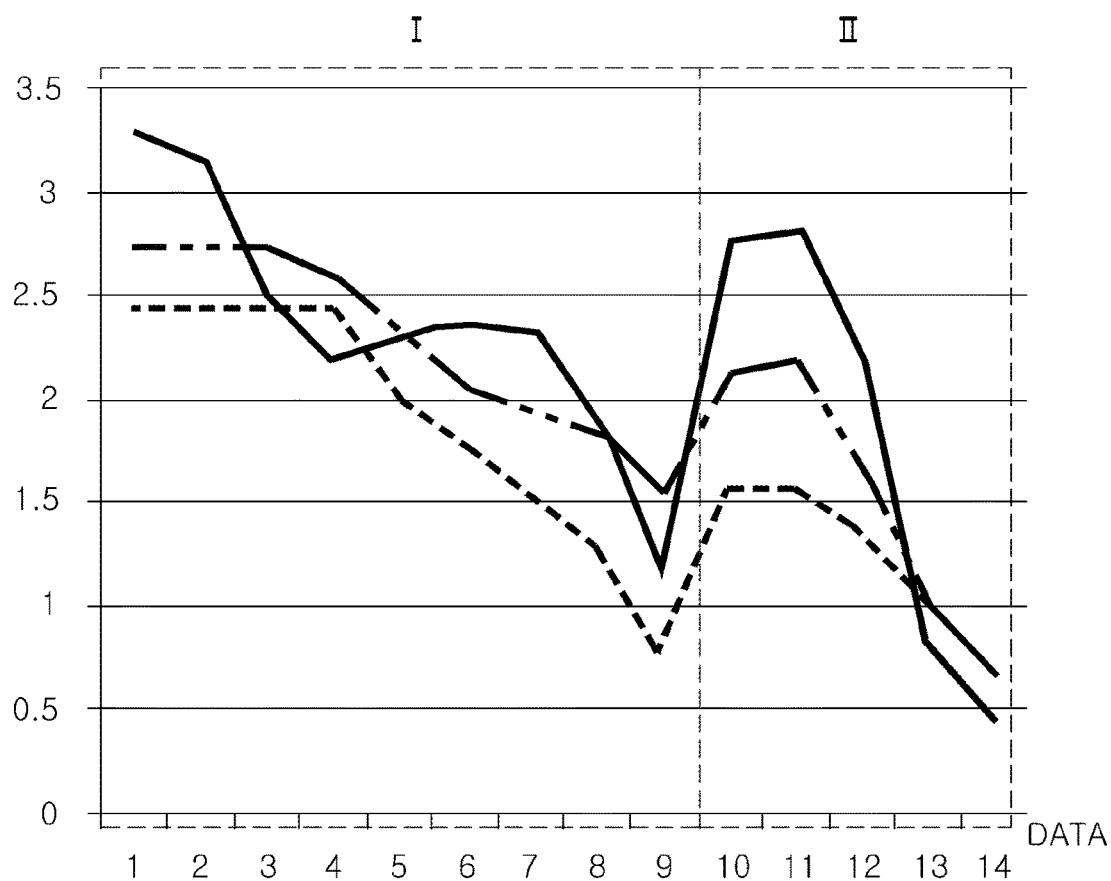
FIG. 11 is an example graph showing values processed so as to use current values shown in FIG. 9 as input data of an artificial neural network.
Figure 12:
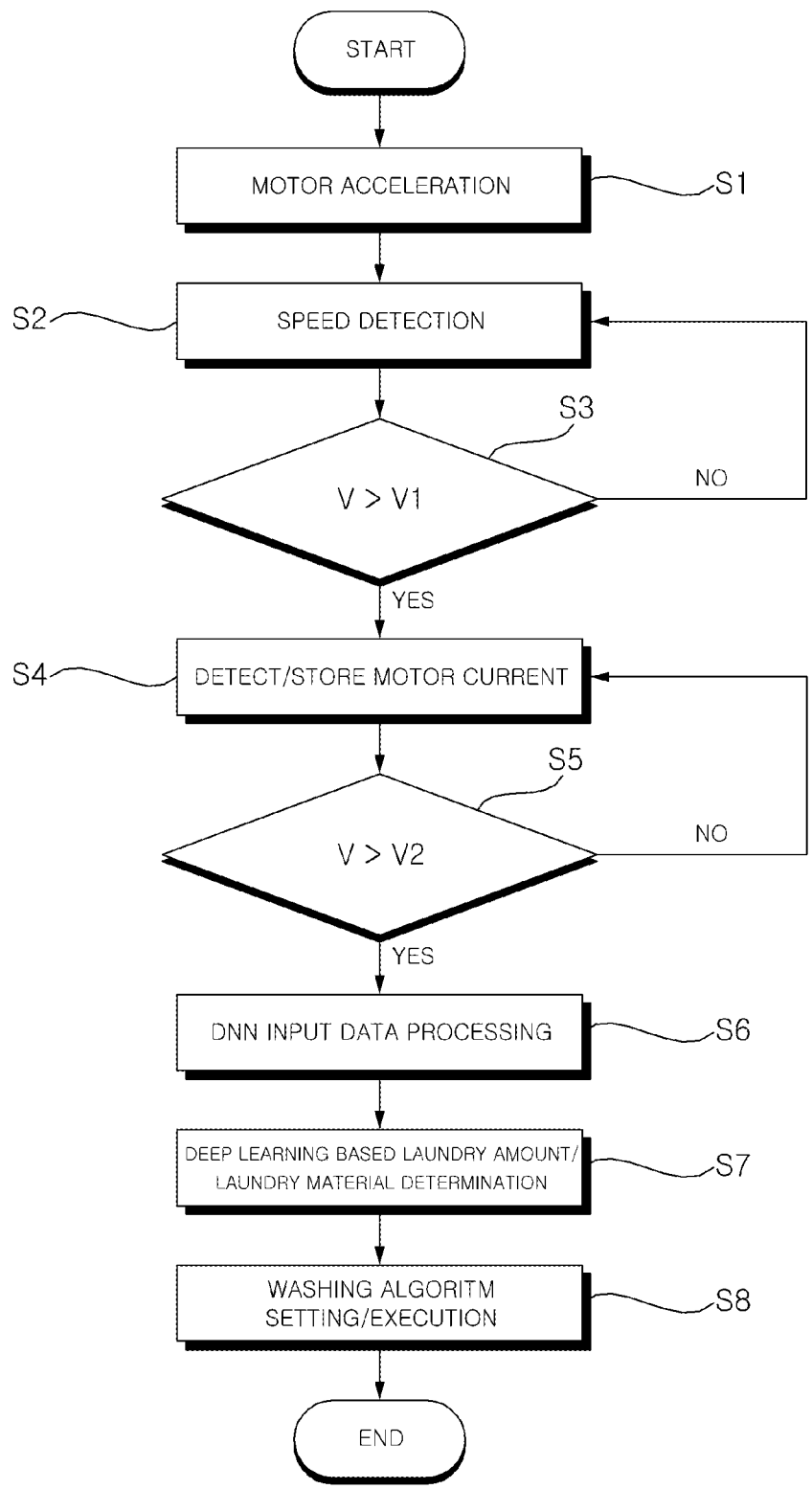
FIG. 12 is a flowchart illustrating an example method of controlling a washing machine.

FIG. 9A is an example graph showing current value detected by a current detection unit, and FIG. 9B is a graph showing average values acquired by processing a moving average filter. FIG. 10 is an example graph showing current values detected by a current detection unit. FIG. 11 is an example graph showing values processed so as to use current values of the graph shown in FIG. 9 as input data of an artificial neural network. FIG. 12 is a flowchart illustrating an example method of controlling a washing machine according to an embodiment of the present disclosure. Hereinafter, a method of determining the laundry amount and the laundry material will be described with reference to FIGS. 9 to 12.

The controller 60 controls the motor 9 to rotate at a preset target rotation speed (S1, S2, S3, S4, S5). The rotation speed of the washing tub 4 (or the motor 9) is detected by the speed detection unit 74 while the motor 9 is rotating (S2).

The target rotation speed may be set to the rotation speed of the washing tub 4 that can maintain the state where laundry is attached to the drum 42, when the washing tub 4 maintains the target rotation speed and is continuously rotated once or more in one direction. That is, the target rotation speed may be determined as the rotation speed of the washing tub 4 at which the laundry can rotate integrally with the drum 42. When the washing tub 4 is rotated at the target rotation speed, the centrifugal force acting on the laundry due to the rotation of the washing tub 4 may be larger than the gravitational force acting on the laundry.

The target rotation speed may be 60 to 80 rpm, preferably 80 rpm. Preferably, in the state before the rotation speed of the washing tub 4 reaches the target rotation speed, the laundry flows in the drum 42. That is, the laundry is raised to a certain height due to the rotation of the drum 42, and then fall down.

Meanwhile, the target rotation speed may be determined based on a state in which the washing tub 4 is partly submerged in water as water is supplied into the water storage tank 3. That is, when the washing tub 4 is rotated at the target rotation speed in the state of being partly submerged in water, the laundry may flow. In other words, during the rotation of the washing tub 4, the laundry is not always attached to the drum 42, but may be raised to a certain height and then fall down.

The present current values used to determine the laundry amount and the laundry material include those taken in a section in which the flow of the laundry occurs during the rotation of the washing tub 4. That is, the controller 60 may take necessary present current values based on the rotation speed of the washing tub 4 (or the rotation speed of the motor 9) detected by the speed detection unit 74.

Specifically, after the controller 60 instructs the motor driving unit 71 to accelerate the motor 9, when the rotation speed detected by the speed detection unit 74 reaches a preset first rotation speed V1, the present current value from that time may be stored in the memory 76 (S3 to S4).

When the rotation speed V of the washing tub 4 reaches a preset second rotation speed V2, the controller 60 may treat the present current value without storing the present current value any more (S5 to S6). Here, the second rotation speed V2 is the above mentioned target rotation speed.

Meanwhile, the acceleration slope in a section accelerated from the first rotation speed V1 to the second rotation speed V2 may be constant. It is preferable that the acceleration slope is maintained constant so as to improve the reliability of the current pattern change detection.

The acceleration slope should not be too high so that the change trend of the laundry flow inside the washing tub 4 can be clearly seen. The acceleration slope is preferably 1.5 to 2.5 rpm/s, more preferably 2.0 rpm/s, but is not necessarily limited thereto. The acceleration slope may be as small as possible within a range that can be controlled by the controller 60.

Figure 6:
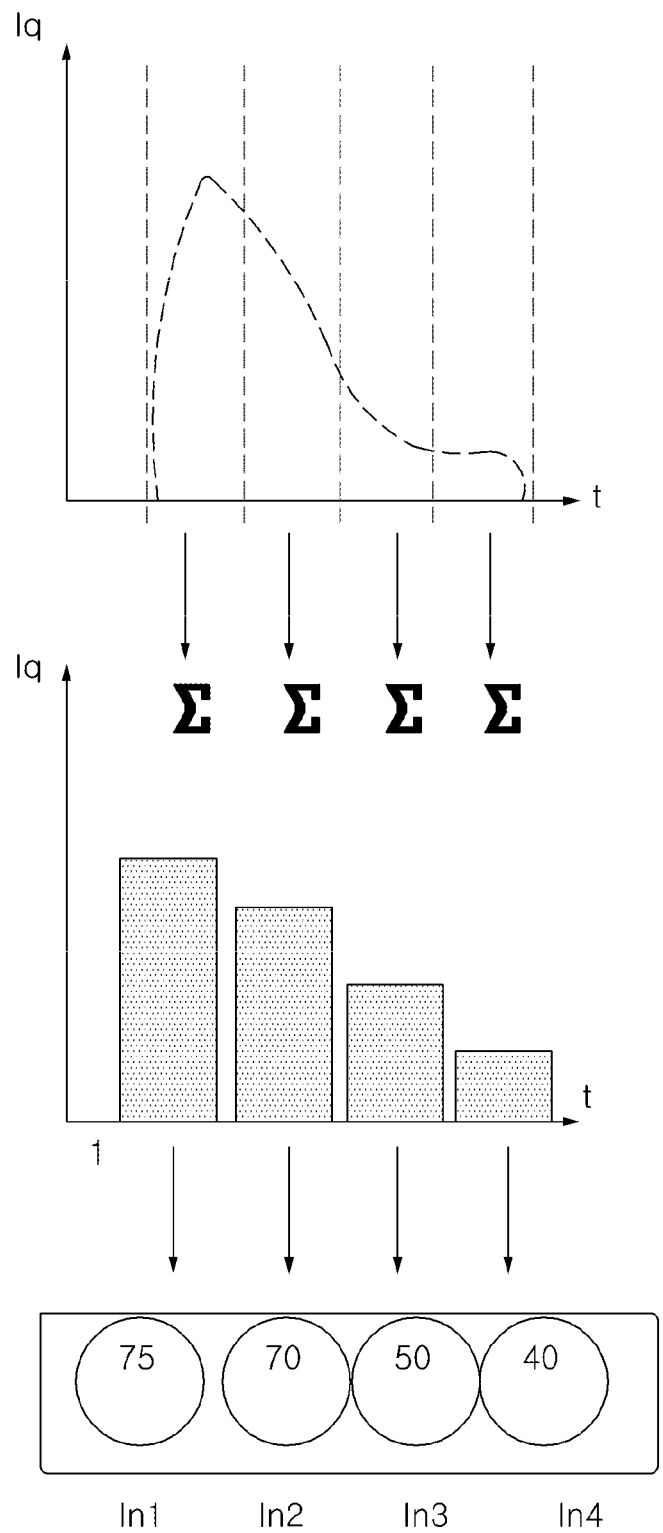
FIG. 6 illustrates an example process of processing current values acquired by a current detection unit as input data of an artificial neural network.

As shown in FIG. 6, the treating of the present current value is a process of processing the present current values Iq acquired at preset time points according to a preset algorithm and generating input data (In1, In2, In3, In4, . . . ) of the input layer of the artificial neural network (S6).

This process may include a step of acquiring an average of the present current values Iq, and a step of treating the acquired average values according to a preset parsing rule to generate input data of the artificial neural network. In particular, the number of input data treated by the parsing rule is less than the number of average values.

Referring to FIG. 8, the controller 60 may acquire a current value at a certain time interval through the current detection unit 75. In the embodiment, a total of 545 present current values are acquired at a certain time interval in a section in which the rotation speed of the washing tub 4 is accelerated from the first rotation speed V1 to the second rotation speed V2.

The controller 60 may average the present current values, which is acquired in such a manner, every certain time section. At this time, the controller 60 may use a moving average filter. Moving average is an operation of acquiring average while moving the section so as to see trend changes. For example, if the present current values are Iq1, Iq2, Iq2 . . . Iqn in the time sequential order, M1 is acquired by averaging Iq1 to Iq1 (1<n), and M2 is acquired by averaging Iqm (m>1) to Iqm+s−1 (s is the number of Iq used to acquire each moving average). Moving averages may be acquired while continuing to move the section in this manner.

The number of moving average values M1, M2, . . . may be implemented smaller than the number of total present current Iq, by appropriately setting the time sections through which the moving average is acquired. However, since the resolution of the change trend of the present current becomes lowered as the length of the time section (window) becomes longer, the length of the time section should be appropriately selected. In the embodiment, the controller 60 uses the moving average filter to acquire 50 moving averages from 545 present current values Iq.

The controller 60 may process the present current value and the moving averages according to a preset parsing rule to generate the input data (In1, In2, In3, In4, . . . ). The parsing rule may be configured to select the section through which the final input data is acquired so that the feature to be acquired (laundry amount/laundry material) is well revealed.

Referring to FIG. 10, a total of 14 input data are generated in the embodiment of the present disclosure. The input data includes nine present current values acquired in the early stage of acceleration of the motor 9 (16th to 24th present current values: DATA1 to DATA9), and five average values (DATA10 to DATA14) in each section obtained by dividing the subsequent section according to a pre-setting. In particular, by acquiring the above mentioned five average values based on the previously acquired moving averages, the calculation can be processed more quickly in comparison with the case of summing the present current values in each section. Meanwhile, such acquired input data (In1, In2, In3, In4, . . . In14) becomes the input value of each node of the input layer.

The weight and bias applied to the nodes constituting the artificial neural network are decided by machine learning, and this machine learning is repeated based on the current pattern or the present current values. In addition, since the current pattern (or present current value) reflects the characteristics of the laundry amount and/or the laundry material, improved or accurate weight and bias value can be set by performing machine learning for the data pre-stored or added by the operation of the washing machine until accurate result (i.e., the exact laundry amount and laundry material currently loaded into the washing tub 4) is derived.

In the artificial intelligence network constructed in this manner, the output of the output layer will reflect the laundry amount and laundry material information, and the controller 60 may determine the laundry amount and/or laundry material based on the node that outputs the largest value among the nodes of the output layer.

The controller 60 may input the input data generated in step S6 to the artificial neural network, and acquire the laundry amount and/or laundry material by using the output of the output layer (S7). Then, the controller 60 may set a washing algorithm based on the laundry amount and/or laundry material acquired in step S7, and control the operation of the washing machine according to the setting (S8). The washing algorithm may include a water supply level, an execution time of washing, rinsing, dewatering, drying, and the like, a driving pattern of the motor in each process (e.g., rotation speed, rotation time, acceleration, braking), and the like.

Figure 13:
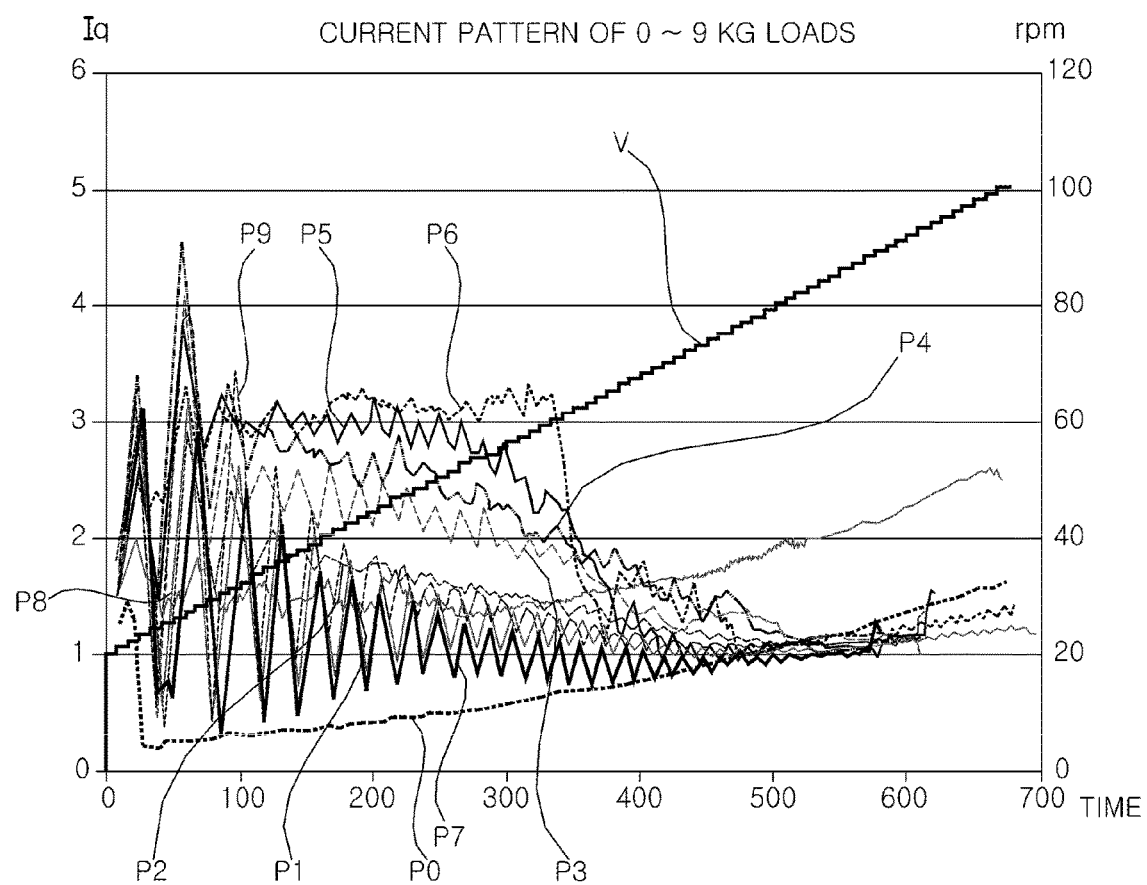
FIG. 13 is an example graph in which current patterns for each load are superimposed.
Figure 14:
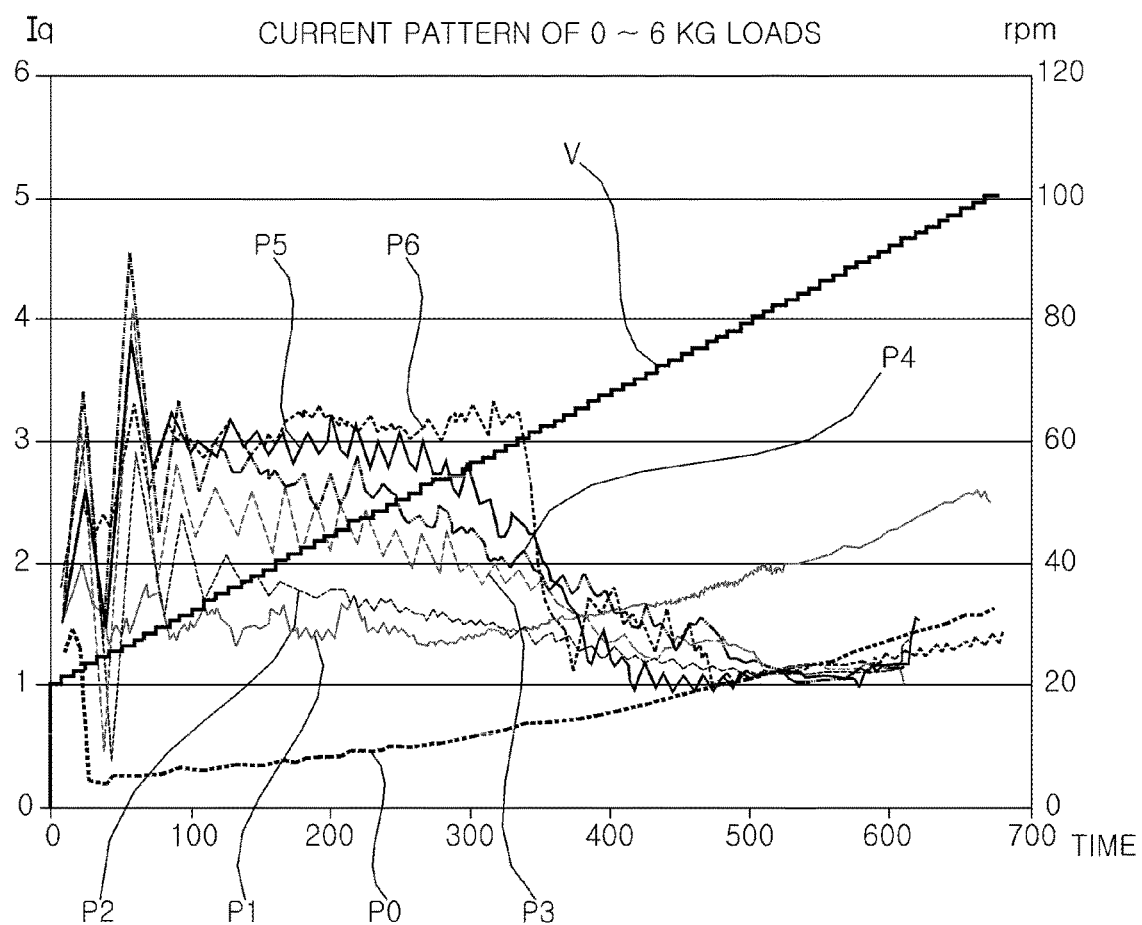
FIG. 14 is an example graph in which current patterns corresponding to loads of 0 to 6 kg are classified in FIG. 13.
Figure 15:
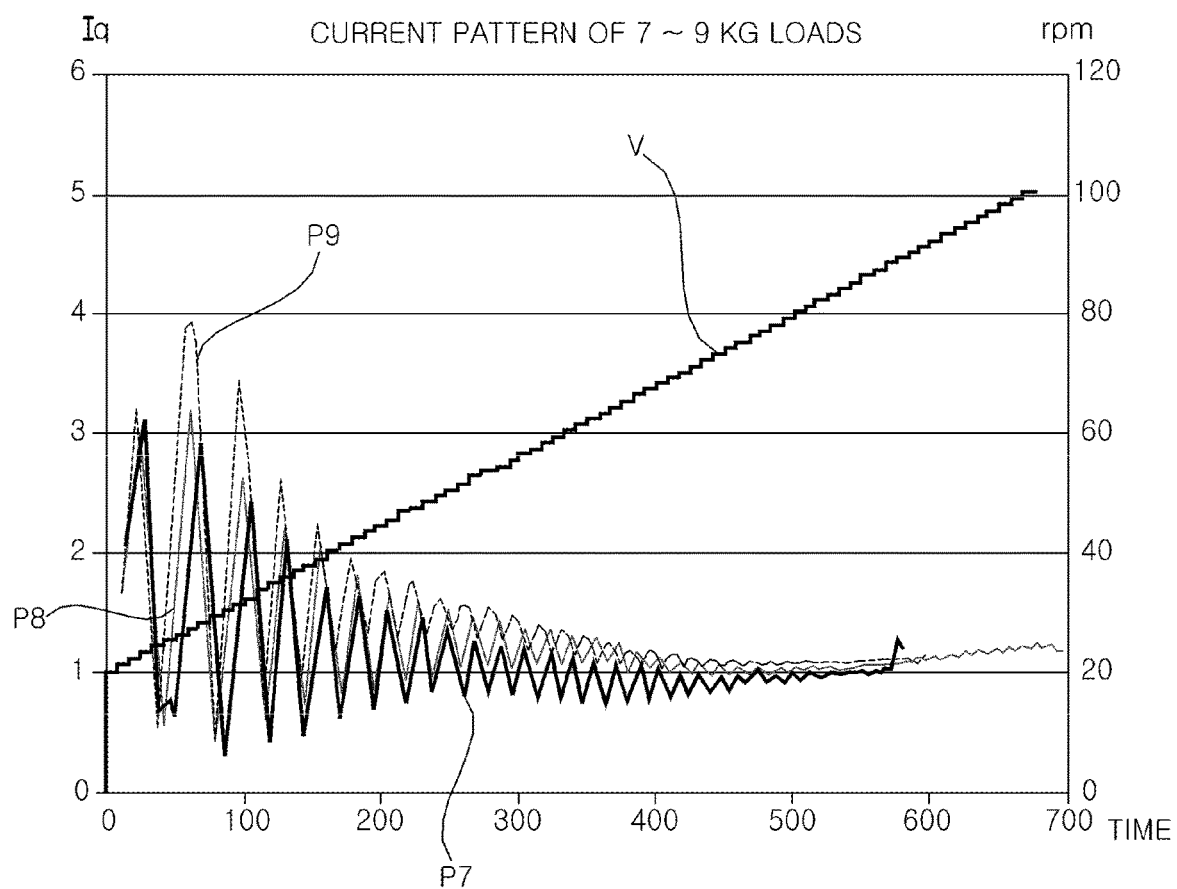
FIG. 15 is an example graph showing current patterns corresponding to loads of 7 to 9 kg in FIG. 13.

FIG. 13 is an example graph in which current patterns for each load are superimposed. FIG. 14 is an example graph in which current patterns corresponding to loads of 0 to 6 kg are classified in FIG. 13. FIG. 15 is an example graph showing current patterns corresponding to loads of 7 to 9 kg in FIG. 13.

Hereinafter, referring to FIGS. 13 to 15, P0 to P9 shown in drawings indicate load amounts (laundry amount) of 0 to 9 kg, respectively.

A problem that the laundry is restrained by the door 2 may be occurred. Such a phenomenon occurs when a large amount of laundry is loaded into the washing tub 4 to be adhered to or interfered with the door 2. The restraint of the laundry affects the load applied to the motor 9. Therefore, it is preferable to exclude the present current value acquired by rotating (or accelerating) the washing tub 4 in a state in which the laundry is restrained in the process of determining the laundry amount and/or laundry material.

Referring to FIGS. 14 to 15, the current pattern (P0 to P6) in the load amount of 0 to 6 kg and the current pattern (P7 to P9) in the load amount of 7 to 9 kg are clearly distinguished. That is, in the case of a large amount of laundry (7 to 9 kg in the embodiment), it can be seen that the current value is periodically increased or decreased (or vibrated) in the early stage of acceleration of the washing tub 4. This is because the movement of some of the laundrys is restrained by the door 2 so that the load of the motor 9 increases when the washing tub 4 is interfered with the restrained laundry and then the load of the motor 9 decreases when the interference is weakened or disappeared. That is, a load variation of the motor 9 due to the restraint of the laundry is generated in correspondence with the rotation period of the washing tub 4.

Such a load variation pattern may be learned through machine learning, and such learning result may be stored in the memory 76 as a database. An artificial neural network may be configured by using such a learning result. Based on such configured artificial neural network, the controller 60 may determine the laundry restraint (or laundry jamming) by the output of the output layer.

Figure 16:
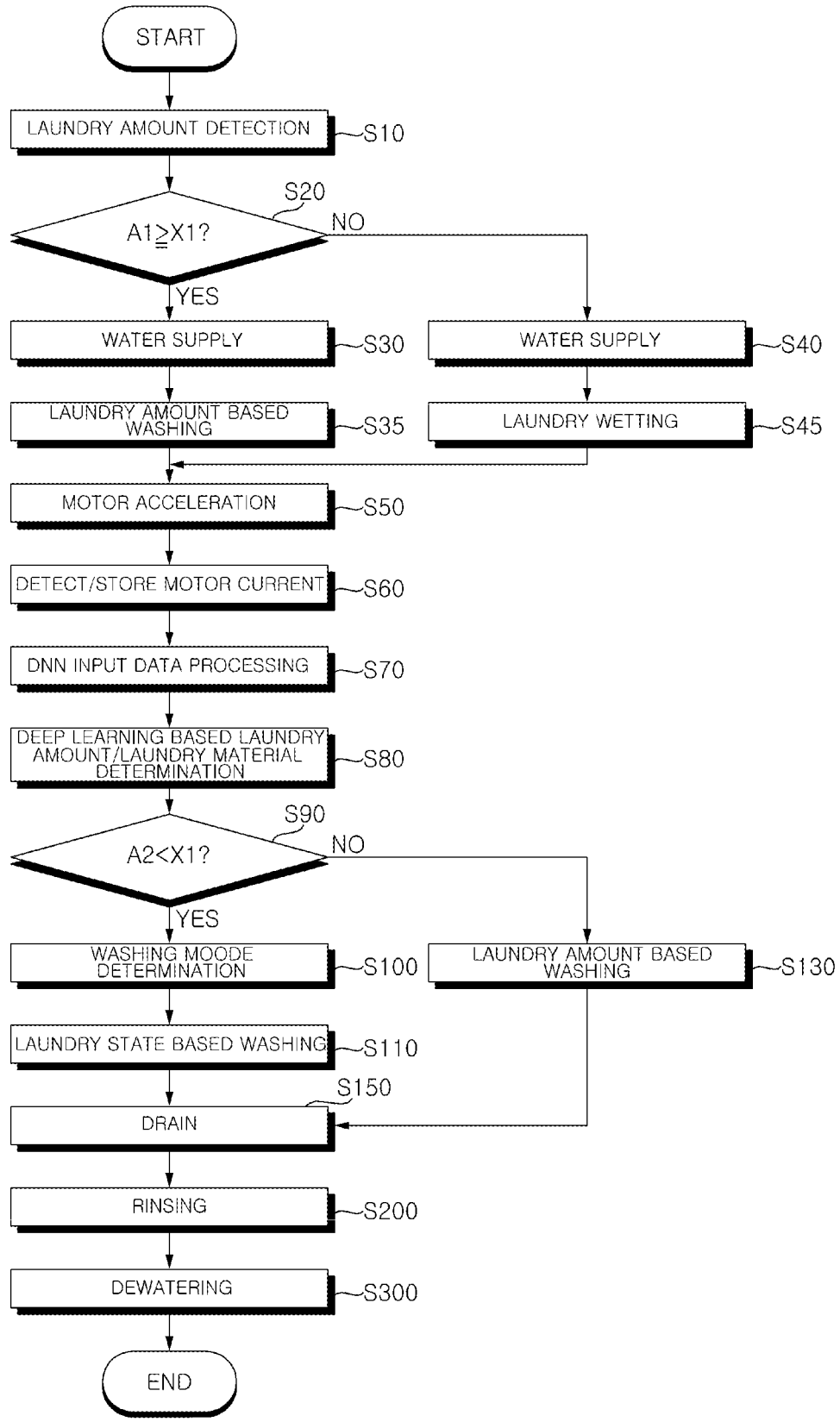
FIG. 16 is a flowchart showing an example method of controlling a washing machine.

FIG. 16 is a flowchart showing an example method of controlling a washing machine. Hereinafter, a method of controlling the washing machine according to the first embodiment of the present disclosure will be described with reference to FIG. 16.

The method of controlling the washing machine according to the first embodiment of the present disclosure includes a step of detecting the amount of laundry using an artificial neural network. The artificial neural network can be used to detect the state of the laundry as well as the amount of the laundry.

However, the step of detecting the amount of laundry by using the artificial neural network may be performed, as described above, by slowly accelerating the rotation speed of the motor until the rotation speed of the motor reaches a target rotation speed V2, and using the detected current value as an input data for the input layer of the artificial neural network. Accordingly, when a detection step using the artificial neural network is performed at the initial stage of the operation of the washing machine, a user may feel that the detection step is rather long.

In addition, if laundry jamming occurs, the determination of laundry amount and laundry material may be inaccurate. Therefore, the laundry amount may be acquired by using the conventional laundry amount detection technology at the initial stage of the washing, and it may be determined whether to perform a laundry amount/laundry material detection step using an artificial neural network based on the acquired laundry amount.

A method of controlling a washing machine according to a first embodiment of the present disclosure includes a first detection step (S10) of acquiring the laundry amount accommodated in the washing tub 4, and a first washing step (S30, S35) of performing washing based on a first laundry amount A1, when the first laundry amount A1 acquired in the first detection step is equal to or greater than a first threshold value X1. In addition, after the first washing step, the control method of the washing machine includes a second detection step (S50, S60, S70, S80) of acquiring the laundry amount accommodated in the washing tub 4 by the output of the output layer of the artificial neural network while using a current value inputted to the motor 9 as an input data of the input layer of an artificial neural network previously learned by machine learning, and a second washing step (S100, S110) of performing washing based on the second laundry amount, when the second laundry amount A2 acquired in the second detection step is smaller than the first threshold value X1.

In the second detection step, the artificial neural network may be used to acquire not only the amount of laundry but also the state of laundry. In addition, in the second washing step (S100, S110), if the second laundry amount A2 is smaller than the first threshold value X1, the washing may be performed based on the second laundry amount A2 and the state of laundry.

The state of laundry may be defined based on several factors such as the material of laundry, the degree of softness (e.g., soft laundry/hard laundry), the ability of laundry to hold water (i.e., moisture rate), a difference in volume between dry laundry and wet laundry, the composition of laundry (i.e., the mixing ratio of the soft laundry and stiff laundry).

In the state where the laundry is inserted into the washing machine, the amount of laundry is acquired by a conventional method of detecting the amount of laundry (first detection step), and the amount of laundry is acquired again by using the artificial neural network (second detection step). The same laundry is accommodated in the washing tub, but the method of detecting the amount of laundry differs. Thus, the first laundry amount A1 acquired in the first detection step and the second laundry amount A2 acquired in the second detection step may be acquired differently.

In the conventional method of detecting the amount of dry laundry, the amount of laundry is acquired by using any one value of a load applied to the motor 9 when the washing tub 4 is rotated, a time taken to stop the washing tub 4, and the like. In comparison, in the method of acquiring the amount of laundry and the state of laundry by using the artificial neural network, the accurate amount of laundry can be acquired by using the present current value Iq according to the rotation speed V of the motor 9 in a section where the motor 9 is accelerated, as an input data.

Hereinafter, the control method of the washing machine according to the first embodiment of the present disclosure will be described in detail.

When the power is turned on, the washing machine stands by a state in which the user can input a washing course through an input unit (77). The washing course that the user can select may include various washing courses such as a standard washing course, a boiling course, a baby clothes course, an old stains course, and the like.

When the washing course is inputted, the amount of the laundry accommodated in the washing tub is acquired (S10). In the first detection step for acquiring the amount of the laundry, the amount of laundry can be acquired by a conventional method of detecting the amount of laundry.

Based on the first laundry amount A1 acquired in S10, it is determined whether to perform washing based on the laundry amount or whether to acquire the laundry amount or the state of laundry by using the artificial neural network (S20). If the first laundry amount A1 is equal to or greater than the first threshold value X1, the washing is performed based on the laundry amount (S30, S35). If the first laundry amount A1 is smaller than the first threshold value X1, the laundry amount or the state of laundry are acquired by using the artificial neural network (S40 to S80).

Referring to FIGS. 13 to 15, the first threshold value X1 may be preset to an amount of laundry having a high probability of being restrained to the door. In the present embodiment, the first threshold value X1 may be preset to a value corresponding to 7 kg.

Meanwhile, FIGS. 13 to 15 illustrate the current pattern when the laundry is inputted from the viewpoint of a designer, and the user can input the laundry more randomly in the real life. Therefore, even in the case of the same laundry amount, volume may be larger at an early stage, so that even if laundry having a weight of 7 kg or less is loaded, the laundry may be restrained to the door. Therefore, the first threshold value X1 may be 7 kg or less. For example, the first threshold value X1 may be set to 5 kg. Referring to Table 1, the output of the laundry amount in the output layer of the artificial neural network may be laundry amount of one to three levels.

In the above described method of acquiring the amount of laundry and the state of laundry by using the present current value of the motor 9 as the input data of the input layer of the artificial neural network and using the output, the amount of laundry and the state of laundry can be determined more accurately when the laundry is a dry laundry than in the case of wet laundry.

Therefore, when the first laundry amount A1 is smaller than the first threshold value X1, the controller 60 controls the water supply valve 5 to supply the washing water to the washing tub 4, before acquiring the laundry amount and the laundry material (S40). After the washing water is supplied, a laundry wetting step (S45) is performed to wet the laundry. In the laundry wetting step S45, it stands by for a certain time in a state where the washing water is supplied to the washing tub 4, or the washing tub 4 may rotate to evenly wet the laundry. In addition, when the washing machine has a circulation pump (not shown) for circulating the water stored in the water storage tank 3 and a circulation nozzle (not shown), the washing water can be circulated to efficiently wet the laundry.

After the laundry wetting step, the amount and the state of the laundry can be acquired through steps S50 to S80 which are the same as S1 to S7 described with reference to FIG. 12.

Meanwhile, when the first laundry amount A1 is equal to or larger than the first threshold value X1, a general washing is processed because the determination of laundry material/laundry amount using the artificial neural network may be inaccurate as the laundry is restrained to the door 2. The above mentioned general washing refers to a method of performing washing in accordance with a preset algorithm based on the amount of laundry without considering the state of laundry.

The general washing includes a water supply step (S30) in which the controller 60 controls the water supply valve 5 to supply the washing water to the washing tub 4, and a first washing step (S35) of performing washing based on the laundry amount.

After the first washing step (S35), there is a case where the second washing step (S110) is performed by modifying the washing course according to the laundry amount A2 acquired by using the artificial neural network.

Accordingly, in the water supply step (S30) that is performed when the first laundry amount A1 is equal to or greater than the first threshold value X1, the washing water may be supplied through a different flow path from the water supply step (S40) that is performed in the case where the first laundry amount A1 is smaller than the first threshold value X1.

For example, the dispenser 7 into which the detergent is put may include two dispensers, or one dispenser may be partitioned into two or more spaces. One of the dispensers (or one space of the dispenser) may be a dispenser into which a detergent for pre-washing is put, and the other dispenser (or the other space of the dispenser) may be a dispenser into which a detergent for main washing is put.

In the water supply step (S30) that is performed when the first laundry amount A1 is equal to or greater than the first threshold value X1, the washing water may be supplied to the washing tub 4 through the dispenser for pre-washing is put. In the water supply step (S40) that is performed in the case where the first laundry amount A1 is smaller than the first threshold value X1, the washing water may be supplied to the washing tub 4 through the dispenser into which the detergent for main washing is put.

The first washing step (S35) is a step of performing washing according to a preset algorithm based on the amount of the laundry. For example, the amount of water, the washing time, and the like may be preset based on the amount of the laundry.

Since a step of determining the laundry amount/laundry material using the artificial neural network is performed after the first washing step S35, the first washing step S35 may include a step of adjusting the washing water supplied to the water storage tank 3.

In steps S40 and S45, the washing water and the detergent are only supplied to the washing tub 4, and the detergent is not completely dissolved in the washing water. However, in steps S30 and S35, the detergent is completely dissolved in the washing water as the washing is progressed. Therefore, even if the same amount and state of the laundry are inputted into the washing tub, the amount of laundry and the state of the laundry determined by using the artificial neural network may be derived differently depending on whether it is detected before washing or during washing.

In order to minimize such a difference, the first washing step 35 may include a step of re-supplying the washing water after draining the washing water. In the step of re-supplying the washing water, the washing water may be supplied to the washing tub 4 through the dispenser for main washing.

After terminating the first washing step 35, the amount and the state of the laundry can be acquired through steps S50 to S80 which are the same as S1 to S7 described with reference to FIG. 12. That is, S50 includes S1, S2, and S3, S60 includes S4 and S5, S70 is the same as S6, and S80 is the same step as S7.

The second detection step (S50, S60, S70, S80) executed after the first washing step 35 includes a step (S50) of accelerating the washing tub 4 or the motor 9, a step (S60) of acquiring a current value applied to the motor in a section in which the washing tub 4 is accelerated and rotated, and a step (S80) of acquiring the laundry amount and the laundry state by the output of the output layer of the artificial neural network, by using the current value as input data of the input layer of the artificial neural network (S70).

The step of accelerating the washing tub S50 includes the step of detecting the rotation speed V of the motor 9 (or the washing tub 4). The step of accelerating the washing tub S50 includes a step of accelerating and rotating the washing tub 4 from a first rotation speed V1 to a second rotation speed V2 which is faster than the first rotation speed. The step of accelerating the washing tub S50 may include a step of accelerating the rotation speed V of the washing tub 4 from the first rotation speed V1 to the second rotation speed V2 at a constant acceleration. That is, the controller 60 may accelerate the motor 9 at a constant acceleration when accelerating the motor 9 from the first rotation speed V1 to the second rotation speed V2.

The step (S70, S80) of acquiring the laundry amount and the laundry state includes a step of using the current value Iq applied to the motor 9 as the input data of the input layer of the artificial neural network in a section in which the rotation speed V of the washing tub 4 is accelerated from the first rotation speed V1 to the second rotation speed V2. More specifically, the step of acquiring the laundry amount and the laundry state may include a step of selecting a current value corresponding to a section in which the rotation speed V of the motor is accelerated from the first rotation speed V1 to the second rotation speed V2 that is faster than the first rotation speed, among the current values acquired in the step S60 based on the detected speed value, and a step of using the selected current value as input data of the input layer of an artificial neural network.

The control method of the washing machine according to the present embodiment may include a step (S90) of determining whether to perform washing reflecting the laundry state based on the second laundry amount A2 acquired in the second detection step after the second detection step.

When the second laundry amount A2 is smaller than the first threshold value X1, the controller 60 determines one of the plurality of washing modes classified in consideration of the risk of wear of the laundry and the washing intensity (S100), and executes a second washing step (S110) for performing washing according to the determined washing mode.

The controller 60 may select any one of the plurality of washing modes based on the laundry state and the second laundry amount acquired in the second detection step. A washing algorithm for each washing mode is stored in the memory 76, and the controller 60 performs washing according to the washing algorithm of the selected washing mode.

Hereinafter, an example of a method of selecting the washing mode based on the laundry state and the second laundry amount will be described with reference to Table 3.

TABLE 3

| Laundry material | Laundry amount | | | | |
| --- | --- | --- | --- | --- | --- |
| | Level 1 | Level 2 | Level 3 | Level 4 | Level 5 |
| Level 1 | First washing mode | | | Second washing mode | |
| Level 2 | | | | | |
| Level 3 | Third washing mode | | | Fourth washing mode | |
| Level 4 | | | | | |
| Level 5 | Fifth washing mode | | | | |

Referring to Tables 1 to 3, if the laundry state is level 1 or level 2, and the second laundry amount is levels 1 to 3, the controller may select the first washing mode. The controller may select the second washing mode when the laundry state corresponds to level 3 or level 4, and the second laundry amount is levels 1 to 3.

Referring to Table 2, in the case where the laundry state is level 1 or level 2, the laundry put in the washing tub 4 is laundry of a soft material which is easy to be worn by washing, and needs to be washed according to a washing algorithm that does not damage the laundry. In addition, since the laundry of such a material is often relatively less contaminated, relatively high washing performance is not required.

Therefore, in the first washing mode, the washing algorithm may be set to a relatively slow rotation speed of the washing tub, a low temperature of washing water, and a low net acting ratio in comparison with other washing mode. The net acting ratio refers to the ratio of the time when the motor operates to the washing time.

The controller 60 may select the second washing mode, when the laundry state is level 1, level 2 or when the laundry amount is large (level 4, level 5). The second washing mode may be set to an algorithm suitable for washing a large amount of laundry, in comparison with the first washing mode.

When the laundry state is level 1, level 2, and the laundry amount is level 4 or level 5, if the washing is performed using the same washing algorithm as in the first washing mode, the washing performance may be deteriorated due to a large amount of the laundry. Therefore, in the second washing mode, the washing algorithm may be set to a relatively high rotation speed of the washing tub, and a high net acting ratio in comparison with the first washing mode.

The laundry having the laundry state of levels 3, 4 is less likely to be damaged by washing in comparison with the laundry having the laundry state of 1, 2, and may be relatively heavily contaminated. Therefore, in the third washing mode, the washing algorithm may be set to a relatively high rotation speed of the washing tub, a high temperature of washing water, and a high net acting ratio, in comparison with the first washing mode.

The controller 60 may select a fourth washing mode when the laundry state is level 3, level 4, or when the amount of the laundry is large (level 4, level 5). The fourth washing mode may be set to an algorithm suitable for washing a large amount of laundry, in comparison with the third washing mode.

For the same reason as that described in the second washing mode, in the fourth washing mode, the washing algorithm may be set to a relatively high rotation speed of the washing tub 4, and a high net acting ratio, in comparison with the third washing mode. In addition, the algorithm may be set to supply a larger amount of washing water, in comparison with the third washing mode. The temperature of the washing water in the fourth washing mode may be set to be equal to or higher than the temperature of the washing water in the third washing mode.

When the laundry state is level 5, the laundry put in the washing tub is a laundry made of a tough material which does not need to be worried about the laundry damage due to washing. Accordingly, when the laundry state is level 5, the controller 60 may select washing level 5 regardless of the second laundry amount. In a fifth washing mode, a washing algorithm having an excellent washing performance may be set. In the fifth washing mode, the washing algorithm may be set to a high rotation speed of the washing tub 4, a high temperature of washing water, and a high net acting ratio, in comparison with the third washing mode.

The rotation speed of the washing tub 4 may be set within a range in which the laundry flows in the washing tub 4. In the first to fifth washing modes, the rotation speed may be set within the range of 30 rpm to 60 rpm.

Meanwhile, in consideration of the risk of wear of the laundry and the washing intensity, the washing time may be set to a longer time in a washing mode requiring high washing performance.

However, if the washing time of the first washing mode is short, the washing performance may be too low. In the fifth washing mode, the washing time is long and the user may feel uncomfortable.

Therefore, the washing times in the first to fifth washing modes may be set to be the same.

The description of the above-described washing mode is merely an example for the sake of understanding, and is not intended to limit the present disclosure.

Although the above description is based on a front load type in which the washing tub 4 is rotated about a substantially horizontal axis, the washing machine and the control method of the present disclosure can be also applied to a top load type.

Meanwhile, the method of operating the robot and the robot system according to the embodiment of the present disclosure can be implemented as a code readable by a processor on a recording medium readable by the processor. The processor-readable recording medium includes all kinds of recording apparatuses in which data that can be read by the processor is stored. Examples of the recording medium that can be read by the processor include a ROM, a RAM, a CD-ROM, a magnetic tape, a floppy disk, an optical data storage apparatus, and the like, and may also be implemented in the form of a carrier wave such as transmission over the Internet. In addition, the processor-readable recording medium may be distributed over network-connected computer systems so that code readable by the processor in a distributed fashion can be stored and executed.

The washing machine and the control method according to the present disclosure can analyze a current pattern of a motor based on a machine learning based artificial neural network. Particularly, such a current pattern varies depending on the state of the laundry contained in the washing tub, and reflects the characteristics of various laundries such as the laundry amount, the laundry material, the flow of the laundry. Therefore, by using the current pattern as the input data of the artificial neural network constituted through the learning based on the machine learning, the laundry can be classified accurately and quickly.

Particularly, such a laundry classification according to characteristic can be achieved by not only laundry amount but also by various criteria such as the laundry material, the moisture rate, the volume of the wet laundry and the dry laundry. Furthermore, the accuracy can be further improved as the training data (motor current data) of machine learning is accumulated.

In addition, when the amount of laundry contained in the washing tub is a certain level or more, it is difficult to accurately detect the laundry amount and/or the laundry state through a current pattern analysis due to the friction between the laundry and the door. Therefore, it is determined whether it is difficult to determine the accurate laundry state due to the friction of laundry according to the laundry amount, so that washing suitable for the situation can be performed.

In addition, it is possible to quickly determine in the early stage whether to perform laundry amount/laundry material detection based on machine learning by a known laundry amount detection method, and to correct the washing course and perform the washing in consideration of the state of the laundry, when the laundry amount determined by the known laundry amount detection method is inaccurate.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

What is claimed is:

1. A method of controlling a washing machine, comprising:
    acquiring, in a first detection step, a first laundry amount accommodated in a washing tub;
    responsive to a determination that the first laundry amount acquired in the first detection step is equal to or greater than a threshold value, performing, in a first washing step, washing based on the first laundry amount;
    responsive to a determination that the first laundry amount acquired in the first detection step is less than the threshold value, supplying washing water to the washing tub to wet laundry in the washing tub;
    acquiring, in a second detection step, a second laundry amount and a state of the laundry accommodated in the washing tub, the second laundry amount and the state of the laundry being an output of an artificial neural network that uses a current value applied to a motor for rotating and accelerating the washing tub as input data;
    responsive to a determination that the second laundry amount acquired in the second detection step is equal to or greater than the threshold value, performing washing based on the second laundry amount; and
    responsive to a determination that the second laundry amount acquired in the second detection step is less than the threshold value, performing, in a second washing step, washing based on the second laundry amount and the state of the laundry,
    wherein washing water is supplied to the washing tub for the first washing step by:
        responsive to a determination that the first laundry amount acquired in the first detection step is equal to or greater than the threshold value, supplying washing water to the washing tub through a dispenser that includes a detergent for pre-washing, or
        responsive to a determination that the first laundry amount acquired in the first detection step is less than the threshold value, supplying washing water to the washing tub through a dispenser that includes a detergent for main washing, and
    wherein the state of the laundry is classified by a risk of abrasion of the laundry and a washing intensity.

2. The method of claim 1, wherein the second detection step comprises:
    accelerating and rotating the washing tub from a first rotation speed up to a second rotation speed that is higher than the first rotation speed;
    acquiring the current value applied to the motor in a section in which the washing tub is accelerated and rotated to the second rotation speed; and
    acquiring the second laundry amount based on the current value.

3. The method of claim 2, wherein the second rotation speed is a rotation speed at which the laundry is rotated integrally with the washing tub.

4. The method of claim 2, wherein accelerating and rotating the washing tub comprises:
    accelerating the washing tub at a constant acceleration from the first rotation speed up to the second rotation speed.

5. The method of claim 2, wherein acquiring the second laundry amount comprises:
    acquiring the second laundry amount based on the current value applied to the motor in a section in which the rotation speed of the washing tub is accelerated from the first rotation speed up to the second rotation speed.

6. The method of claim 2, wherein the second detection step further comprises detecting a rotation speed of the washing tub.

7. The method of claim 6, wherein acquiring the second laundry amount comprises:
    selecting a current value corresponding to a section in which the washing tub is accelerated from the first rotation speed up to the second rotation speed among current values acquired based on the detected rotation speed of the washing tub; and
    acquiring the second laundry amount based on the selected current value.

8. The method of claim 1, wherein the second washing step comprises:

selecting one of a plurality of washing modes classified by the risk of abrasion of the laundry and the washing intensity based on the second laundry amount and the state of the laundry; and performing washing according to the selected washing mode.

9. The method of claim 1, wherein the artificial neural network is trained by machine learning.

10. The method of claim 9, wherein the second detection step comprises:

acceleratating and rotating the washing tub from a first rotation speed to a second rotation speed that is greater than the first rotation speed, acquiring the current value applied to the motor in a section in which the washing tub is accelerated and rotated to the second rotation speed, and acquiring the second laundry amount based on the output of the artificial neural network while using the current value as the input data for the artificial neural network.

11. The method of claim 10, wherein acquiring the second laundry amount comprises:

using the current value applied to the motor as the input data in a section in which the rotation speed of the washing tub is accelerated from the first rotation speed to the second rotation speed, wherein the second detection step further comprises detecting a rotation speed of the washing tub, and wherein acquiring the second laundry amount comprises:

selecting a current value corresponding to a section in which the washing tub is accelerated from the first rotation speed up to the second rotation speed among current values acquired based on the detected rotation speed of the washing tub, and using the selected current value as the input data for the artificial neural network.

* * * * *